United States Patent [19]
Green et al.

[11] Patent Number: 5,199,263
[45] Date of Patent: Apr. 6, 1993

[54] COMBUSTION SYSTEM WITH REDUCED SULFUR OXIDE EMISSIONS

[75] Inventors: Terence W. Green, Temple; Melanie K. Lange, Milam County, both of Tex.

[73] Assignee: Texas Utilities Electric Co., Dallas, Tex.

[21] Appl. No.: 744,061

[22] Filed: Aug. 12, 1991

[51] Int. Cl.⁵ .................... F01K 21/00; C01B 17/00
[52] U.S. Cl. .................................. 60/670; 423/242.2
[58] Field of Search ............ 423/242 A; 60/643, 645, 60/670

[56] References Cited

U.S. PATENT DOCUMENTS 2,080,779  5/1937  Lessing .................. 423/242 A
3,556,722  1/1971  Owaki .................... 423/242 A Primary Examiner—Allen M. Ostrager
Attorney, Agent, or Firm—Worsham, Forsythe, Sampels & Wooldridge

[57] ABSTRACT

A coal-fired power plant with a wet scrubber wherein sulfite or bisulfite ions are converted to sulfate ions by forced aeration in the scrubber reaction tank. Air bubbles are introduced at only a few points in the tank, but an impeller is used which continually sweeps fine particulates off the tank bottom until they have reached a certain minimum size.

18 Claims, 13 Drawing Sheets

COMBUSTION SYSTEM WITH REDUCED SULFUR OXIDE EMISSIONS

BACKGROUND OF THE INVENTION

The present invention relates to combustion systems in which the amount of sulfur dioxide in the exhaust gases is reduced. The present invention relates more particularly to a coal-fired steam-electric power generating station.

SULFUR OXIDE EMISSIONS

One of the most abundant fossil fuels is coal. Immense deposits of coal can be mined fairly cheaply, so that the net cost per BTU is low. Thus, coal has long been a popular boiler fuel. However, coal is somewhat difficult to burn cleanly.

One of the difficulties in burning coal arises from the high sulfur content of some coals. This is especially a problem with lignites. Since coal is a solid, it is not easy to chemically extract the sulfide fraction, as can be done with natural gas. When coal is burned, the sulfur content will largely oxidize to sulfur dioxide, with some sulfur trioxide. Both of these gases dissolve in water to form acidic solutions.

Great concern has been expressed over the release of sulfur oxides into the atmosphere. It is widely believed that sulfur oxide emissions from combustion make a major contribution to the so-called "acid rain" phenomena.

Desulfurization of emissions from coal-fired plants is a particularly acute need. However, the same problem can arise in plants burning liquid or gaseous fuel. Many deposits of natural gas or crude oil are "sour," i.e. have a high sulfur content. Unless the sulfur content of these fuels is artificially reduced, combustion of them will also produce sulfur oxides.

WET SCRUBBER SYSTEMS FOR FLUE GAS DESULFURIZATION

In some chemical systems, a gaseous mixture can be at least partially separated by selective absorption into a liquid. Scrubber technology is an application of this principle to clean up waste gasses for discharge into the atmosphere. Scrubbers are widely used to remove sulfur oxides from smokestack exhaust gas flows. This technology has been widely used for power plant exhaust gas cleanup since the 1970s.

In such a gas-liquid separation process, it is necessary to ensure that substantially all molecules of the gas component have a chance to be absorbed by the liquid.[1] Therefore, in a wet scrubber, a large surface area of liquid-gas contact must be provided. This is most commonly done by showering a mist downward through a tower in which the gas is flowing upward, but numerous other methods can be used.[2]

[1] This requires that every element of the gas flow come within a diffusion length of a gas-liquid interface. To maximize the area of the gas-liquid interface, the liquid is dispersed as droplets, which are sprayed downward, in counterflow to the exhaust gas stream, through the large volume of the scrubber. This produces a large effective surface area.

[2] See generally *Perry's Chemical Engineers' Handbook* (6th ed. 1984), which is hereby incorporated by reference, at pages 18–41 through 18–45, and at Table 26–12 and accompanying text. Scrubbers in which a liquid is sprayed or drizzled down into an upward-flowing exhaust stream (as in the presently preferred embodiment) are referred to as "countercurrent" scrubbers; scrubbers in which the direction of gas flow and droplet flow are the same are referred to as "co-current" scrubbers.

GENERAL FEATURES

The sulfur oxide gases (sulfur dioxide and sulfur trioxide) will both readily dissolve in water. Both form acid solutions.

This property has been exploited to help clean up the exhaust gasses from power plants and other large consumers of fossil fuel. If the gas stream makes close contact with a basic solution, or a slurry of a basic solid, these solutions will tend to remove sulfur oxides from the gas flow.

Many variations on this basic chemistry have been proposed or tried. The present invention is particularly related to wet scrubber designs in which forced oxidation and precipitation are used to produce a sulfate compound as an end-product. The present invention is more particularly related to wet scrubbers which include a large fraction of calcium compounds in their feedstock, and most especially to scrubbers using a limestone slurry for sulfur oxide absorption.

SCALING

An important constraint on scrubber solution chemistry is the deposition of hard precipitates ("scale") on the internal surfaces of the scrubber tower and the scrubber reaction tank. This process is known as scaling, and can require a scrubber tower to be shut down for expensive cleaning. Calcium sulfite scale is fairly easy to remove, but calcium sulfate scale can be (literally) rock-hard.

A limestone scrubber is at risk for calcium sulfate scaling if the fraction of calcium sulfate is between about 15 percent and about 90 percent.[3] This deposit can grow to tremendous thickness, and require the scrubber tower to be removed from service for cleaning.

[3] If the sulfate-to sulfite ratio is less than about 15%, calcium sulfate will preferentially segregate from the solution into solid calcium sulfite (if present), to form a co-precipitated sulfite/sulfate composition. This maintains the concentration of calcium sulfate below saturation. However, if more than approximately 15% of the absorbed $SO_2$ is oxidized to $SO_4^{-2}$, the sulfate cannot all be incorporated into the sulfite crystal lattice, and the concentration of calcium sulfate will increase until calcium sulfate precipitation occurs.

Scale formation is particularly likely on the mist eliminator surfaces (at the scrubber tower), on internal bracing, beams, and piping, and on ladder vanes (which are used, in some system designs, where a horizontal exhaust gas flow is turned upward to enter the scrubber tower). As noted, large deposits of sedimentary scale also occur inside the scrubber reaction tank.

Scaling can be controlled, but only to some extent, by ensuring that a large number of calcium sulfate seed crystals are in suspension in the scrubber liquid.

Scaling can be reduced by using anti-scaling additives; but the disclosed innovations provide cost savings in this area, by keeping the sulfate/sulfite ratio high. This reduces (or eliminates) scaling, and thus reduces or eliminates the cost of anti-scaling additives.

Thus, to avoid scaling, it is highly desirable to provide efficient oxidation, to increase[4] the ratio of sulfate to sulfite and bisulfite.

[4] An alternative scrubber chemistry process introduces a reducing agent, to shift the sulfite/sulfate ratio in the other direction; but such processes must face the need to dewater the sulfite byproduct.

DISPOSAL OF BYPRODUCT

Handling the products of this reaction poses some problems. Calcium sulfate ($CaSO_4 \cdot 2H_2O$, i.e. gypsum) is a fairly well-behaved reaction product. Ideally, if the reaction products were all calcium sulfate, granular calcium sulfate crystals would precipitate in the reaction tank for the scrubber fluid, and could be pumped off to a drying pond. The water content would then evaporate to leave a stable granular calcium sulfate residue, which can be used, for example, as landfill. Gypsum also has commercial uses, particularly for wallboard and for agriculture.

However, calcium sulfite is much less tractable. Calcium sulfite tends to precipitate (as $CaSO_3 \cdot \frac{1}{2}H_2O$) in the form of small platelets. This microstructure (like that of clay) does not dewater easily.[5] Moreover, the dewatered sulfite has thixotropic (shear-thinning) mechanical properties, which makes handling more difficult.

[5]Gypsum (calcium sulfate, $CaSO_4 \cdot 2H_2O$) crystals usually can be dewatered up to about 85% solids, but the calcium sulfite crystals generally can be dewatered only up to about 60% solids.

When exposed to air, calcium sulfite will gradually oxidize to calcium sulfate. Thus, in the most commonly used sulfite-sulfate process, the sulfite reaction products are oxidized by contact with air to form sulfates. The sulfates can then readily be handled.

DETAILED CHEMISTRY OF A LIMESTONE-FED WET SCRUBBER

In one of the most common types of scrubbers, a slurry of crushed limestone[6] is contacted with a large-volume flow of exhaust gas. The sulfur oxides in the exhaust gas dissolve into the scrubber liquid, and then react with the calcium carbonate to produce an insoluble product, which is a mixture of sulfites ($CaSO_3$) and sulfates ($CaSO_4$).

[6]Limestone is predominantly $CaCO_3$ (calcium carbonate). Typical limestones will also contain 1-2% (by weight) of $MgCO_3$ (magnesium carbonate), and 1-2% of inert species (such as silicates). However, this varies with location; some limestones may contain 5-10% or more of magnesium carbonate. The solubility of magnesium carbonate is fairly low (comparable to that of calcium carbonate), but magnesium sulfite and magnesium sulfate are more soluble than the corresponding calcium compounds.

The chemistry of this system is somewhat complicated. Calcium carbonate ($CaCO_3$), calcium sulfite ($CaSO_3$), and calcium sulfate ($CaSO_4$) are all nearly insoluble.[7] However, calcium bisulfite ($Ca(HSO_3)_2$) is quite soluble. Another peculiarity is that calcium sulfate has not only a stable solid state ($CaSO_4 \cdot 2H_2O$, or gypsum), but also a partially hydrated solid state ($CaSO_4 \cdot \frac{1}{2}H_2O$), which will gradually convert to the fully hydrated state in the presence of water. (This reaction has been observed by anyone who has seen Plaster of Paris harden).

[7]The solubility of calcium carbonate is fairly low. However, the large surface area of the solid particles in a slurry means that dissolution of additional calcium carbonate can occur fairly rapidly, so that additional calcium carbonate is released into the solution as fast as it is depleted by the ongoing reactions.

Thus, there are several important reactions to consider when stack gases are scrubbed with a limestone slurry.

ABSORPTION OF $SO_2$ AND $SO_3$

In the scrubber tower, the sulfur oxides[8] can be directly dissolved into the water. Sulfur dioxide rapidly reacts to form sulfurous acid, and sulfur trioxide reacts to form sulfuric acid. Both of these are strong acids which rapidly dissociate to release a solvated proton[9] $H^+$:

$$SO_2 + H_2O \rightleftharpoons H_2SO_3 \rightleftharpoons H^+ + HSO_3^- \quad (1)$$

$$SO_3 + H_2O \rightleftharpoons H_2SO_4 \rightleftharpoons 2H^+ + SO_4^{-2}. \quad (2)$$

[8]The ratio of $SO_3$ to $SO_2$ in the exhaust gases is dependent on combustion conditions. Typically this ratio is fairly small, of the order of 1-4%, for typical boiler combustion.

[9]In solution, these ions actually have a form such as $H_3O^+$, but usually these ions are represented as $H^+$ for simplicity.

Note that these gas dissolution steps both produce acid products. Therefore, to shift these reactions to the right (i.e. to maximize the of dissolution), it is desirable to maintain the scrubber liquid sufficiently well buffered that it can continue to absorb acid.

The bisulfite ion ($HSO_3^-$) is significantly acidic, and will further dissociate, in a pH-dependent reaction,[10] to form sulfite ions $SO_3^{-2}$:

$$HSO_3^- \rightleftharpoons H^+ + SO_3^{-2}. \quad (3)$$

[10]The pH is a logarithmic scale which indicates the acidity of a solution. A reduction of 1 in the pH value implies a tenfold increase in the equivalent concentration of $H^+$ ions (and therefore, in an aqueous solution, a tenfold decrease in the equivalent concentration of $OH^-$ ions). A neutral solution has a pH of 7.
As the pH value increases, more and more of the bisulfite ions will dissociate to form sulfite ions. (The concentration of sulfite and bisulfite ions will be equal at a pH of about 7.) Similarly, in extremely acidic solutions, the bisulfite ions may be converted to sulfurous acid, by reversing reaction (1) above. The concentration of bisulfite ion and undissociated sulfurous acid will be equal at a pH of about 1.8.
There is also a similar pH-dependent cycle of dissociation between sulfate ions $SO_4^{-2}$ and bisulfate ions $HSO_4^-$. However, this reaction is unimportant for scrubbers, since the sulfate/bisulfate shift occurs only in very acidic solutions (pH 2.5 or less).

LIMESTONE DISSOLUTION

In a mildly acidic solution, the primary reaction for limestone dissolution is $$CaCO_3 + H^+ \rightleftharpoons Ca^{++} + HCO_3^-.$$

This reaction too is somewhat pH-dependent.

EFFECT OF pH

Lowering the pH of the scrubbing liquid will tend to increase the rate of limestone dissolution, and will therefore help improve the limestone utilization efficiency. However, an excessive drop in pH can also lead to decreased $SO_2$ removal efficiencies.

It should also be noted that the interconversions of the dissolved carbonate forms will provide some buffering effect. There is a pH-dependent cycle of dissociation between carbonate ions $CO_3^{-2}$, bicarbonate ions $HCO_3^-$, and carbonic acid $H_2CO_3$ (which readily dissociates to release $CO_2$). The concentrations of carbonate and bicarbonate ions will be equal at a pH of about 10, and therefore the concentration of carbonate ion $CO_3^{-2}$ will be very small in the scrubber liquid. However, the concentrations of bicarbonate ions and carbonic acid will be equal at a pH of about 6.3, and therefore significant interconversions between these species can help to moderate changes in the solution pH. Because large changes in the concentrations of bicarbonate ion $HCO_3^-$ can occur over fairly narrow pH shifts, $SO_2$ removal is generally sensitive to the system pH.

In the scrubber tower, where sulfurous acid is continually being formed, the pH will typically be significantly lower than in the scrubber reaction tank, and therefore limestone dissolution can proceed much more rapidly than in the scrubber reaction tank.

EFFECT OF CHLORIDE CONCENTRATION

A result of the low solubility of many of the calcium compounds is that the concentration of chloride ion can also affect the performance of the scrubber. (The flue gas will typically contain some HCl, which increases the acidity and the chloride ion concentration of the solution. In closed-loop scrubbing systems, chloride concentrations can build up to high levels if there are significant concentrations of HCl in the flue gas.) Calcium carbonate will tend to neutralize the acidity, as above; but, since calcium chloride is highly soluble, the resulting calcium ions are not as likely to be precipitated. Thus, the maximum calcium concentration can increase. This in turn means that the maximum concentration of sulfite ions will decrease.

EFFECT OF SULFITE CONCENTRATION

Dissolution of limestone is inhibited at high sulfite concentrations. This may be due to crystallization of calcium sulfite on the surfaces of the limestone particles.

EFFECT OF ORGANIC BUFFER

Buffer additives such as adipic, acetic, citric, and sulfosuccinic acids have been found to enhance the limestone dissolution rate, apparently by maintaining a constant pH solution.[11] This maintains a constant mass flux of H+ ions to the limestone particle surface. Otherwise pH rises as limestone is dissolved and the availability of the H+ ion for diffusion to the particle surface is reduced.

[11]For example, the successive ionizations of the two acid groups of adipic acid [COOH(CH$_2$)$_4$COOH] provide a buffering effect. In the presently preferred embodiment, an acidic buffering solution, known as "dibasic acid" or "DBA," is used to enhance limestone utilization. This commercial mixture includes adipic acid, glutaric acid, succinic acid, and nitric acid.

OXIDATION OF SULFITE TO SULFATE

As discussed above, waste product disposal is much easier if the reaction products are sulfates rather than sulfites. (In fact, a calcium sulfate byproduct can sometimes be sold rather than having to be disposed of, which further reduces the burden on the environment, and further reduces cost.) Moreover, the complete oxidation of the sulfites reduces the propensity for scaling.

Fortunately, oxidation of sulfites can be made to take place at the mildly warm temperatures of a scrubber reaction tank, simply by contact with the oxygen in air. This reaction is not extremely rapid, but can be accelerated by aerating the scrubber liquid. Thus, it is common practice to bubble air into the scrubber reaction tank to ensure thorough oxidation of sulfites. Such scrubber systems are referred to as forced oxidation systems.[12]

[12]Other types of forced oxidation systems may use oxidation towers, vessels, and/or tanks which are physically removed from the scrubber tower and its collection tank. Many of the innovative teachings herein can be applied to these system configurations too.

The bisulfite ions will be gradually oxidized to sulfate ions:

$$HSO_3^- + \tfrac{1}{2}O_2 \rightleftharpoons H^+ + SO_4^{-2} \qquad (4)$$

The oxidation rate is a function of pH, temperature, and the presence of nitrogen oxides, catalysts, and inhibitors. Apparently the species actually taking part in the overall reaction is the bisulfite ion HSO$_3^-$; however, it is common practice to simply refer to sulfur dioxide oxidation or calcium sulfite oxidation.

Temperature affects the oxidation rate because of its effects on the liquid phase solubility of bisulfite ions and of oxygen,[13] and on the individual reaction rates for the overall oxidation reaction. However, the temperature effects are usually minor.

[13]The solubility of oxygen, like that of most gases, decreases with temperature. The solubility of most solid compounds, such as calcium bisulfate, increases with temperature.

Nitrogen oxides (which will be absorbed from the flue gas) also have some effect: nitrogen monoxide (NO) acts as a sulfite oxidation inhibitor, but nitrogen dioxide (NO$_2$) is a stronger sulfite oxidation promoter than NO is an inhibitor.

The published literature suggests that oxidation can also be increased by the presence of certain transition metal ions, such as manganese, copper, iron, cobalt, and nickel. Manganese is a particularly active catalyst. Even a low concentration of manganese (e.g. 50 ppm) can increase the oxidation rate by orders of magnitude. Residual fly ash may provide a source for such ions, or they may be trace constituents in the limestone. Metal corrosion may be another source.[14]

[14]If carbon steel parts are exposed to the scrubber solution—which is warm, acidic, and loaded with dissolved salts—they will rapidly corrode. In the presently preferred embodiment, all exposed parts of the scrubber tower are made of stainless steel, and all steel parts of the tank are coated; but even a very small rate of corrosion, over the relatively large area of these mechanical structures, may contribute significant trace ion levels.

Sulfite oxidation can be limited by the presence of inhibitors. Many organic materials (especially those bearing hydroxyl groups) and thiosulfate salts inhibit oxidation.

SUPERSATURATION AND PRECIPITATION

The solubility of a compound gives the amount of that compound which will dissolve (or remain dissolved) in equilibrium. If the amount of dissolved compound is above this equilibrium level, the system is referred to as "supersaturated." In a supersaturated solution, the dissolved material can form crystals (or polycrystalline deposits): for example, if crystals of the same material are already present in the solution, those crystals will appear to grow as the excess material is deposited on the crystal surfaces.

If the amount of dissolved material is dozens or hundreds of times the equilibrium level, the excess material will come out of solution immediately, regardless of whether seed crystals (or other nucleation sites) are present. However, if the amount of dissolved material is only few percent above the equilibrium level, the excess material may not come out of solution immediately, depending on the presence of nucleation sites.

In the chemistry of a limestone scrubber, a supersaturated concentration of calcium sulfite or of calcium sulfate will be created by the reactions of sulfur oxide with water and limestone. If this supersaturated concentration causes deposition on the interior surfaces of the scrubber tower or scrubber reaction tank, scaling will occur. However, in the ideal system, the excess material would merely form small particles in the solution. These crystals can remain suspended in the scrubber liquid until they grow large enough to fall out of solution.

ANALYZING SOLUBILITY AND SUPERSATURATION

Solubility problems can be analyzed by means of a solubility product constant $K_{sp}$. For example, if ordinary table salt is dissolved in pure water, the maximum equilibrium concentration is 35.7 grams per 100 cc at 32° F. A more useful way of stating this is as a solubility product constant:

$$[Na^+][Cl^-] \leq K_{sp:Na+,Cl-,0°C.} = 37.3 M^2$$

where the concentrations [Na+] and [Cl−] are calculated, in this example, as moles per liter. The solubility product constant will vary with temperature, but is not affected by the presence of other ions. This formulation permits the maximum concentrations to be calculated where the ions do not all derive from the dissolution of one material. By taking the logarithm of the species concentrations, the equations for solubility limits and for reaction equilibria become simple linear expressions. Thus, saturation and precipitation in multicomponent solutions can be calculated by simple linear algebra and linear programming.

The solubility product can be used to measure relative saturation, i.e. the ratio of the activity product of the soluble ions of a compound divided by the solubility product of the compound. Thus, in any solution containing sodium and chloride ions, the relative saturation is defined as $$RS_{NaCl} = \frac{[Na^+][Cl^-]}{K_{sp:Na+,Cl-}},$$

where
[Na$^+$]=concentration of sodium ions,
[Cl$^-$]=concentration of chloride ions.
This is a simplified example; but a similar solubility product can be written for each of the ion pairs involved in the scrubber liquid, e.g. Ca$^{++}$ and SO$_3^{-2}$, Ca$^{++}$ and SO$_4^{-2}$, Ca$^{++}$ and HSO$_3^-$, Ca$^{++}$ and HCO$_3^-$, etc.

The relative saturation is an indicator of the potential for solid precipitation (i.e., crystal formation). At relative saturations below 1.0, a crystal will dissolve until the solution becomes saturated. Above 1.0, the solution is supersaturated, and crystal growth may occur. At relative saturation levels which are only slightly above 1.0, precipitation will only occur on existing particles, and the precipitation rate increases linearly with relative saturation.

However, at higher relative saturations, heteronucleation and/or free nucleation in the liquid phase, can begin occurring. Nucleation is the formation of an entirely new particle. Heteronucleation is the formation of a new crystal growth site on a solid surface of a different material. Thus, the formation of scale on smooth stainless steel surfaces cannot start unless 1) heteronucleation occurs, or 2) a solid particle (e.g. a solid particle which has been carried along by the liquid flow) attaches to the smooth surface.

For calcium sulfate, free nucleation (and rapid precipitation) will occur when the relative saturation is above a minimum value which is in the range of 1.3 to 1.4. For calcium sulfite, free nucleation (and rapid precipitation) will occur when the relative saturation is above a minimum value which is 3 or higher. For calcium carbonate, free nucleation (and rapid precipitation) will occur when the relative saturation is above a minimum value which is 2 or higher. These values are important to the operation of a limestone scrubber system because they indicate the threshold for scale formation. Above this threshold value, precipitating species can scale out on scrubber internals rather than on existing particles in the slurry.

Ideally, most sulfite/sulfate precipitation would occur in the reaction tank. However, calcium and sulfite/sulfate relative saturations may be higher in the scrubber tower, due to limestone dissolution, SO$_2$ sorption, and sulfite oxidation in the absorber.

Thus, the above reactions in combination have the net effect of absorbing SO$_2$ and consuming limestone and oxygen, to evolve carbon dioxide and precipitate solid gypsum:

$$SO_2 + CaCO_3 + \tfrac{1}{2}O_2 + 2H_2O \rightarrow CaSO_4 \cdot 2H_2O \downarrow + CO_2 \uparrow \quad (A)$$

CONVENTIONAL METHODS FOR OXIDIZING SULFITES IN THE SCRUBBER PROCESS

In one conventional process, introduced by Combustion Engineering, the scrubber reaction tank has a high-volume source of low-pressure air connected to bubble source headers on the bottom of the tank. These bubble headers (referred to as "sparge rings") emit bubbles over a fairly large area. Thus, a significant surface area of liquid-to-gas interface is always present. However, this process has turned out not to work well.

One of the constraints in a tank of carbonate/sulfite/sulfate is foaming. The liquid composition, at the concentrations used, has a high enough film cohesion that large volumes of foam may be generated and blown off the top of the tank if air is ejected at too high a flow rate or too high a pressure.

Thus, in the conventional oxidizing process, as sold by Combustion Engineering and other vendors, a sparge ring (or other manifold shape)[15] is operated at a fairly low pressure, just high enough to overcome the back pressure of liquid. The bubbles emitted by this header provide a large surface area for air/liquid contact, and impellers are typically used to disperse the air bubbles around the tank.[16] The motors to drive these impellers consume a significant amount of power.

[15]Two currently accepted oxidation devices are: 1) The oxidation ring, which usually is about 5 feet off the floor. Usually multiple rings are installed in each tank, with one ring per mixer; and 2) The oxidation header, which is usually located about 1 foot off the floor. Various arrangements are used by different manufacturers. The oxidation header design is used most commonly with side mounted agitators. This design is also commonly used world wide. G.E.E.S.I. uses a duel header system, with the first header located 6 feet off the bottom.
[16]According to the Combusition Engineering handbook, these impellers also help to keep solids in suspension, and maintain liquid/solid mixing.

However, this conventional process has a number of difficulties. First, scale will form in the tank itself. When a tank is shut down for maintenance, it is common to find several feet of scale deposited. This material is typically as hard as low-density rock, and it is not easy to remove.

Another difficulty of the conventional process is that the sparge ring outlets can be plugged by deposits. That is, variations in air supply pressure which permit any solution to enter into the sparge ring can lead to precipitation inside the sparge ring. This precipitation will build up to the point where it blocks passage of air through most or all or the orifices of the sparge ring. Once the sparge ring becomes plugged, scale deposition in the tank will be further accelerated. When the sparge ring has become thus clogged, the scrubber reaction tank must be emptied to get access to the sparge ring for cleaning. This means that the scrubber tower must be shut down, and the plant's total load capacity is reduced. This is expensive. Thus, in practice, the sparge ring/manifold approach has proven not to be very practical.

Another problem with the prior art process is that, in some systems, scale will also deposit on the mist-eliminator surfaces in the scrubber tower. As droplets of the solution are carried upward by the stream of exhaust gases, some may be carried upwards past the highest spray nozzle. Optimal fallout zone design can reduce this problem; but, if this transport occurs, and if the solution has been inadequately oxidized, these droplets are more likely to form tenacious scale deposits.

Another problem with the prior art system is inefficient use of limestone. Deposits formed in the scrubber reaction tank will typically include large amounts of unconsumed limestone. Since the cost of the limestone is significant (on the order of $2-3 million per year per giga Watt), waste of limestone can be a significant cost factor.

Another design variable in such systems is the size of the tank in relation to the rate of circulation of the solution.[17] Systems are typically designed with a turnover time of at least 8 minutes. However, increasing the scrubber reaction tank size adds additional capital cost to the installation of a facility. Moreover, many power plants designed before 1970 did not include scrubbing capability, and not all of them have been retrofitted with scrubbers. If the required scrubber reaction tank size (for a given load) can be reduced, it will be easier to retrofit scrubbing capability to existing power plants.

[17]If the volume of the tank is divided by the rate at which fluid is pumped out of the tank into the scrubber tower, the resulting ratio is a time, referred to as the "turnover" time or "retention" time. This time approximately indicates, in principle, the time required for the entire volume of the tank to circulate through the tower.

SUMMARY OF THE INVENTION

The present invention provides a different approach to the operation of the reaction tank in a sulfite/sulfate scrubbing process. The present invention inventors have discovered that such a scrubber process can be operated, with a relatively small tank, without the problems of scale deposition which have previously occurred, and with a simple apparatus for stirring the tank and introducing air.

The inventors have discovered that it was not nearly as critical as had been thought to introduce bubbles through a large volume of the solution. Instead, it is sufficient to introduce air at only a few points in the solution. In combination with this, the stirring impeller is preferably selected so that the fluid flow will efficiently sweep fine particulates off the bottom of the tank.

One of the innovative teachings herein is that sparge rings (or other submerged air manifold structures) are unnecessary, and that air introduction can be performed by a simple vertical lance. This has several advantages, not least of which is that air flow to a lance can be stopped and restarted without pluggage.

A further advantage is that the air flow to the lances can be dynamically varied, so that the air flow can be increased or decreased depending on the chemical composition of the combustion fuel. (By contrast, with a sparge ring system, it is normally necessary to maintain a constant flow rate.) Moreover, the lances can easily be removed for cleaning or inspection *while the tank remains in service.*

When the disclosed innovative structures were introduced as modifications to an existing tank, it was empirically discovered that:

1. The efficiency of oxidation was increased[18];
2. Scale deposition in the tank was drastically reduced, to almost nothing;
3. Scale deposition on the mist eliminator was reduced;
4. A much smaller amount of power could be used for the impellers to stir the tank;
5. A somewhat smaller amount of airflow was required;
6. The efficiency of limestone utilization was increased. It has been experimentally determined that the modified system can achieve approximately 98% utilization of the limestone (for fuel with up to about 1.4% wt sulfur).

[18]In fact, the principal embodiment described herein has actually achieved an oxidation efficiency in the range of 95% or better for more than two years.

BRIEF DESCRIPTION OF THE DRAWINGS

The present invention will be described with reference to the accompanying figures, which are each hereby incorporated by reference, wherein:

FIG. 4A shows the overall routing of flue gases from the boiler to the stack. FIG. 4B shows additional detail of how the gasses are routed, from the induced-draft fans through the scrubber towers and reheat bypass, to the stack. FIG. 4C shows additional detail of the gas flow from the absorber inlet dampers through to the absorber outlet dampers. FIG. 4D shows additional detail of the interior of one scrubber tower.

DESCRIPTION OF PREFERRED EMBODIMENTS

The presently preferred embodiment will be described in its use as a lignite-fired steam-electric power plant.

OVERALL ARCHITECTURE OF A STEAM-FIRED GENERATING STATION

Most electricity generating stations in the world are steam powered. In a steam-powered power plant, a heat source is used to boil water, producing steam. This steam is then heated further, to produce "live" or "superheated" steam. This steam is passed through one or more turbines (or other energy extraction mechanisms), and the mechanical energy thus obtained from the steam is used to drive a generator to generate electricity.

The live steam will typically be passed through two or more turbine stages in series, to extract as much mechanical energy as possible from the steam flow. Thus, for example, a high-pressure turbine will typically be fed by the as-generated steam at its highest heat and pressure. The exhaust from the high-pressure turbine, which is at a lower heat and pressure, is fed to a low-pressure turbine (which is designed to make use of such lower-pressure steam flows). There may also be other stages, such as an intermediate-pressure turbine, a reheating cycle, a bottoming cycle (to extract the last economical bit of mechanical energy from the steam), and heat exchangers (which scavenge heat from the depleted steam for feed-water heating, process heat, or other such purposes), etc.

Figure 1:
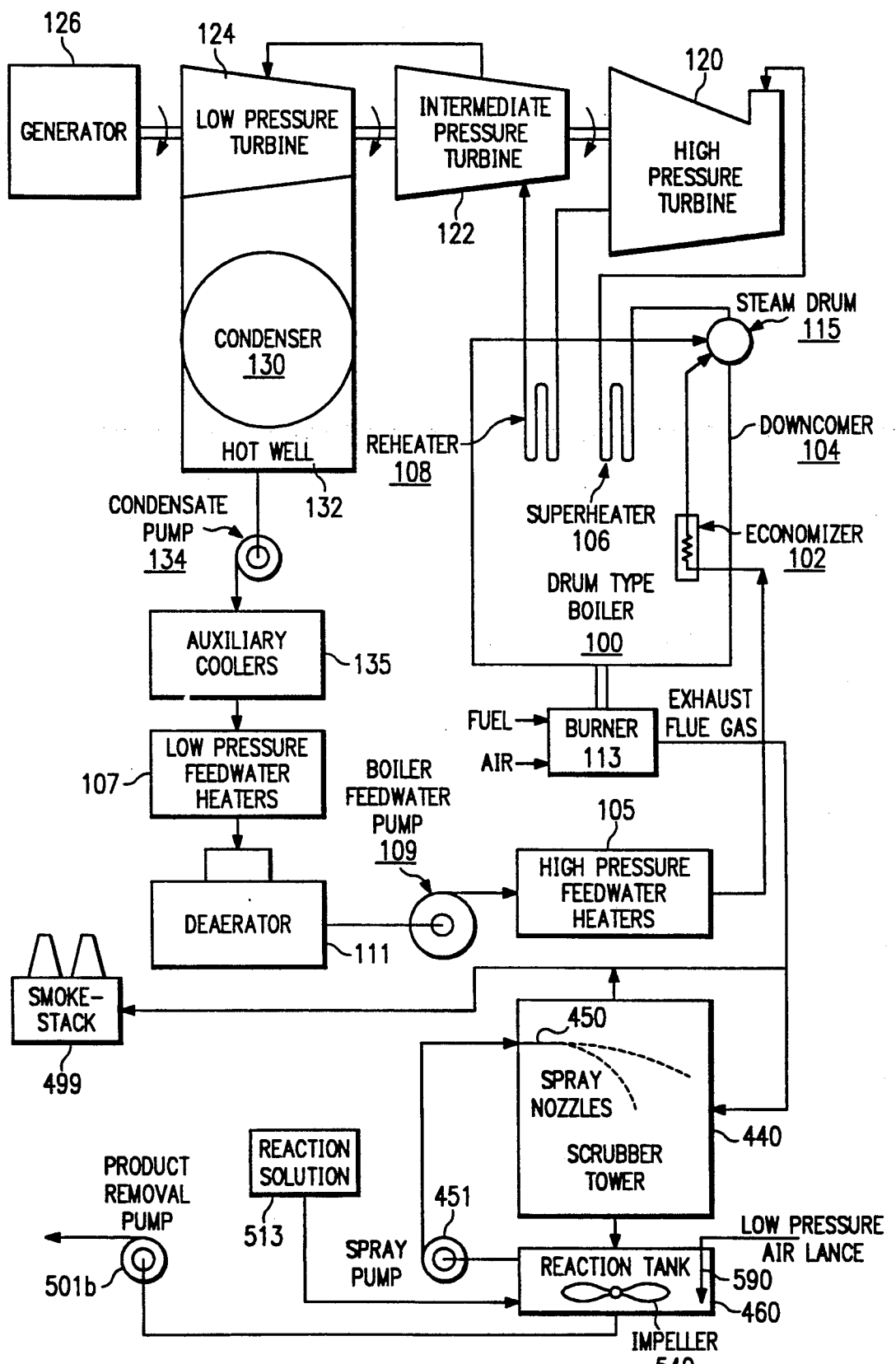
FIG. 1 is an overall schematic view of a steam-powered electric generating station which may contain the disclosed innovations.
Figure 2:
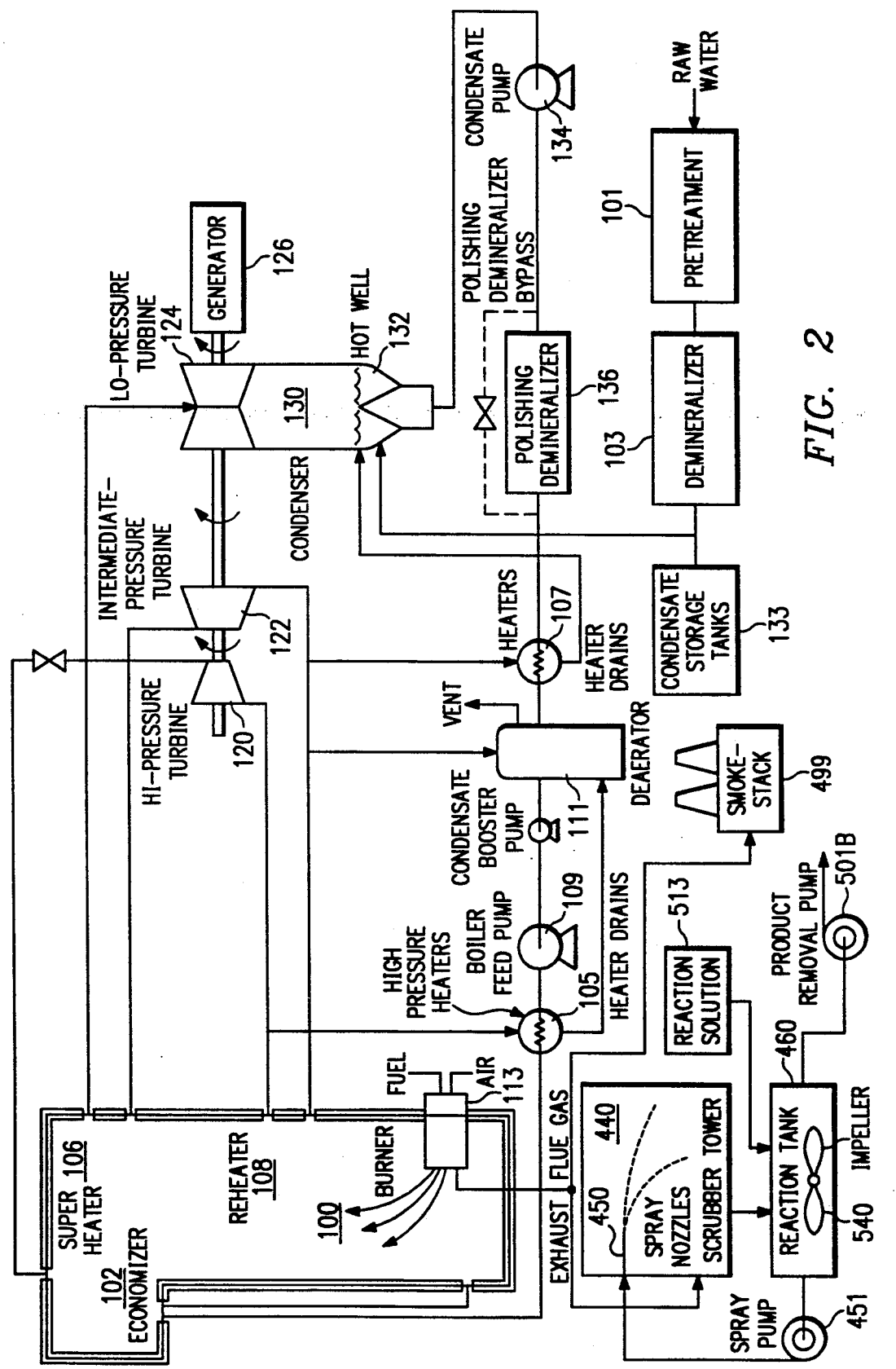
FIG. 2 is slightly more detailed schematic view of such a steam-powered electric generating station, showing additional details of condensate and feedwater handling.
Figure 3:
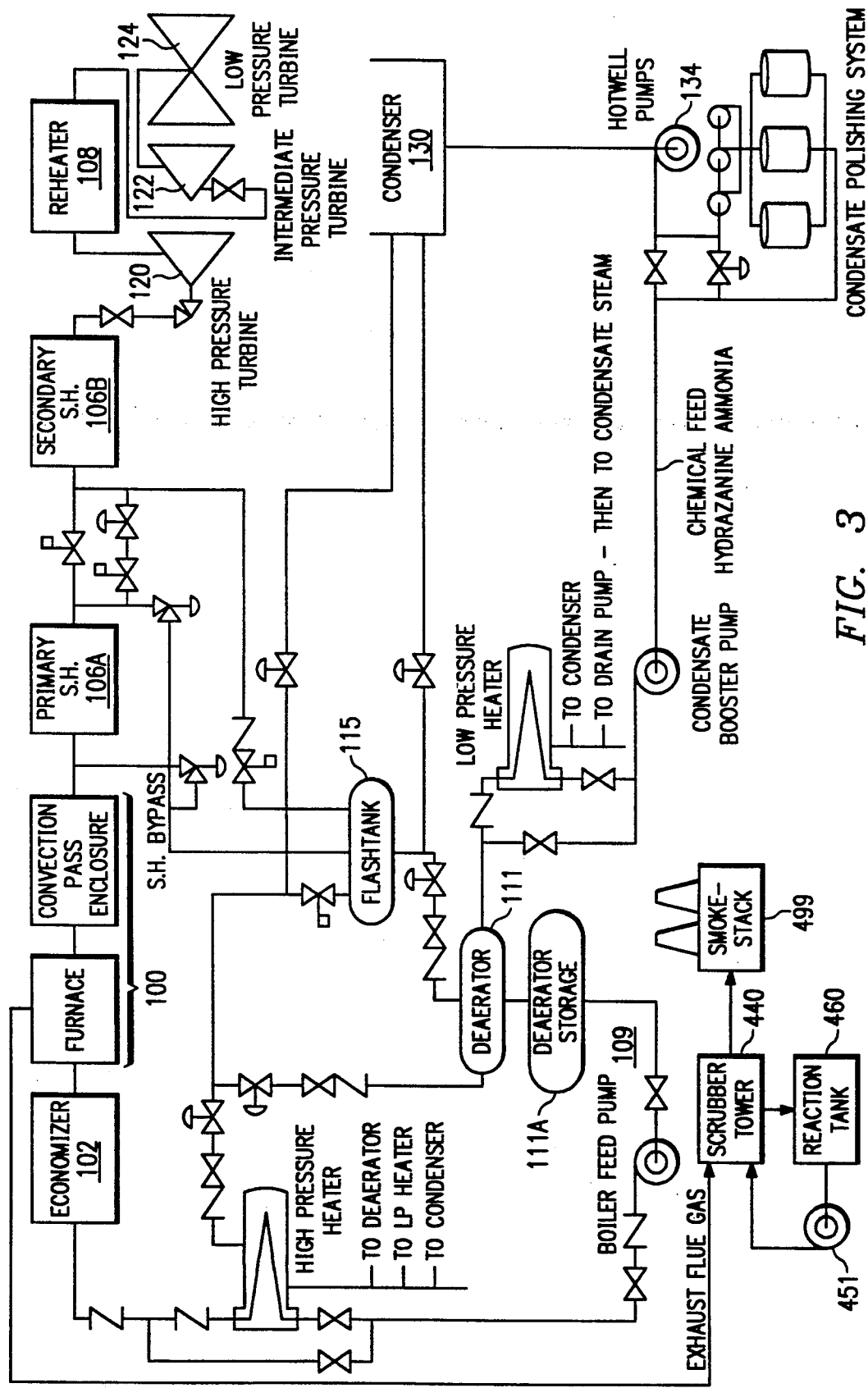
FIG. 3 schematically shows some important control points in such a system.

FIG. 1 is an overall schematic view of a steam-powered electric generating station which may contain the disclosed innovations; FIG. 2 is slightly more detailed schematic view of such a steam-powered electric generating station, showing additional details of condensate and feedwater handling; and FIG. 3 schematically shows some important control points in such a system.

STEAM CYCLE AND ELECTRICITY GENERATION

The cycle of feedwater to steam to condensate will first be described.

For example, in the actual system in which the presently preferred embodiment has been implemented, a boiler 100 is supplied by feedwater pump 109 with slightly more than 4,000,000 pounds per hour of pressurized feedwater, at a pressure of about 4300 psia. The feedwater is heated by multiple feedwater heaters 107 and 105 to a temperature of about 500° F. Further heating occurs in economizer 102, and the water is volatized to form steam. (The steam drum 115 shown in some of the Figures is actually not used in the presently preferred embodiment.) Downcomer 104 and waterwall tubes provide good scavenging of the heat generated by burner 113.

The steam is further heated in superheater 106, to about 1000° F., and fed to high-pressure turbine 120. The pressure at the intake to this turbine is about 3675 psia, and the pressure at the exhaust is slightly over 700 psia. The exhaust from the high-pressure turbine 120 is passed through reheater 108 and provided to the intake of intermediate-pressure turbine 122. The temperature at the intake to intermediate-pressure turbine 122 is about 1000° F., and the pressure at this turbine's exhaust is slightly over 175 psia. The exhaust from the intermediate-pressure turbine 122 is provided to the intake of low-pressure turbine 124. The exhaust from the low-pressure turbine 124 is at a fairly constant temperature of about 160°-165° F., and is fed directly into the condenser 130. (The low-pressure turbine, in the presently preferred embodiment, sits directly on top of the condenser 130.) The pressure at the exhaust of the low-pressure turbine 124 is slightly negative—less than atmospheric—due to the volumetric change which occurs in the condenser 130. At the hot well 132, the temperature will no more than 140° F. (and typically about 125° F.), and the absolute pressure will be about 3 inches of Hg. (This is a vacuum of about 13 psi relative to the atmosphere.) The condensate is then pumped (by pump 134) through minimal further processing stages 133 and 136, into the low-pressure feedwater heater 107, deaerator 111, feedwater pump 109, and high-pressure feedwater heater 105. Thus, most of the boiler's feedwater is recycled condensate. This is supplemented by raw water, processed through pretreatment 101 and demineralizer 103.

EXHAUST GAS ROUTING

FIGS. 4A through 4D are isometric views of the flue gas routing used in the presently preferred embodiment. In the presently preferred embodiment, the combustion gases are flowed through three separate scrubber towers in parallel.

Figure 4A:
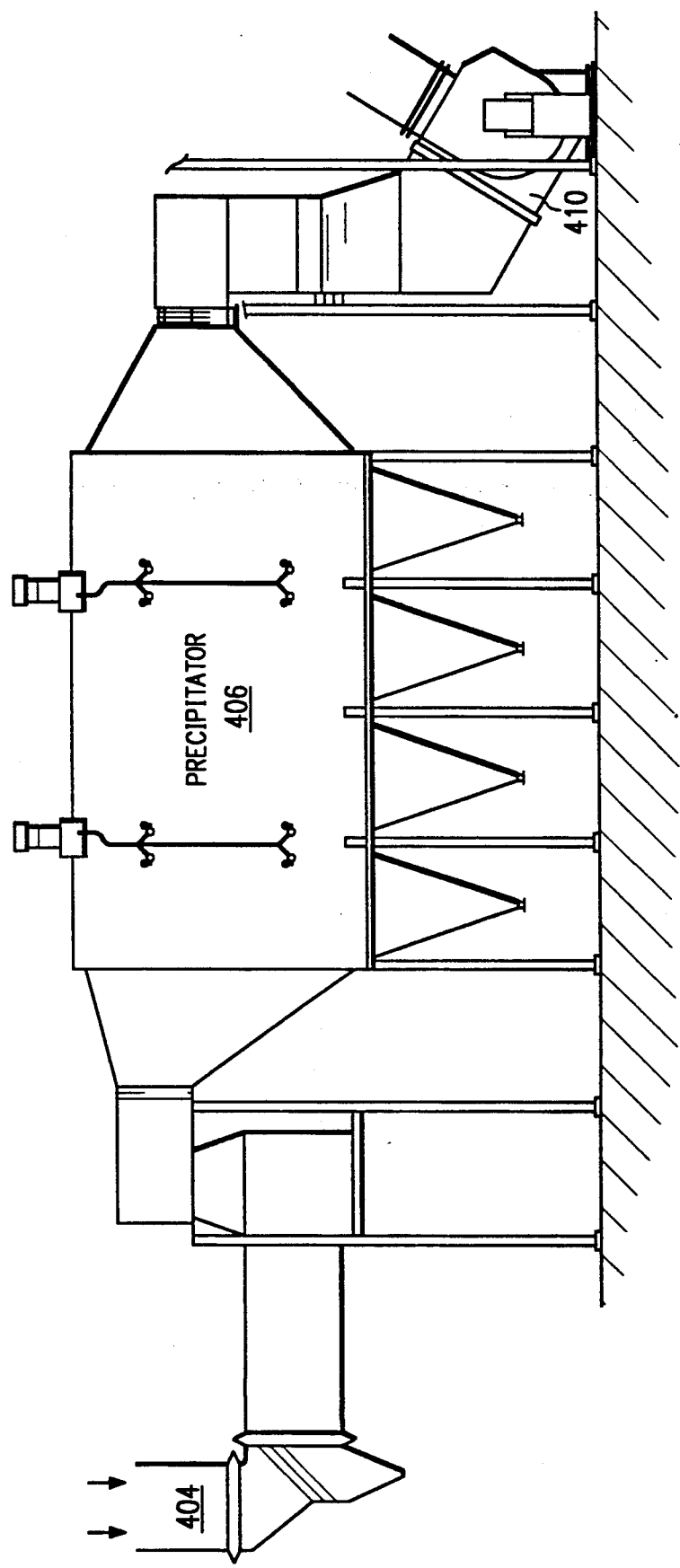
FIGS. 4A, 4B, 4C, and 4D are isometric views of the flue gas routing used in the presently preferred embodiment.

As shown in FIG. 4A, the hot gasses generated in the boiler leave the boiler through outlet 404. At the boiler outlet 404, the exhaust gasses are at about 340° F., and are at a pressure very close to atmospheric. This gas flow is predominantly composed of nitrogen ($N_2$), carbon dioxide ($CO_2$), water ($H_2O$), and oxygen; but it also contains (when high-sulfur coal is being burned) 0.1% or more of $SO_2$, and lesser amounts of other noxious species such as $SO_3$, nitrogen oxides, and HCl.

In the presently preferred embodiment, about 2.5 million cubic feet per minute of exhaust gas flow out of the boiler 100. Of this amount, about 500,000–550,000 cubic feet per minute are flowed through each of the three scrubber towers, and the rest is routed directly to the stack.

A conventional, large, electrostatic precipitator 406 is provided directly downstream of the boiler 100, to remove most of the fly-ash. (In the presently preferred embodiment, the precipitator removes about 99.1% of the fly ash.)

Figure 4B:
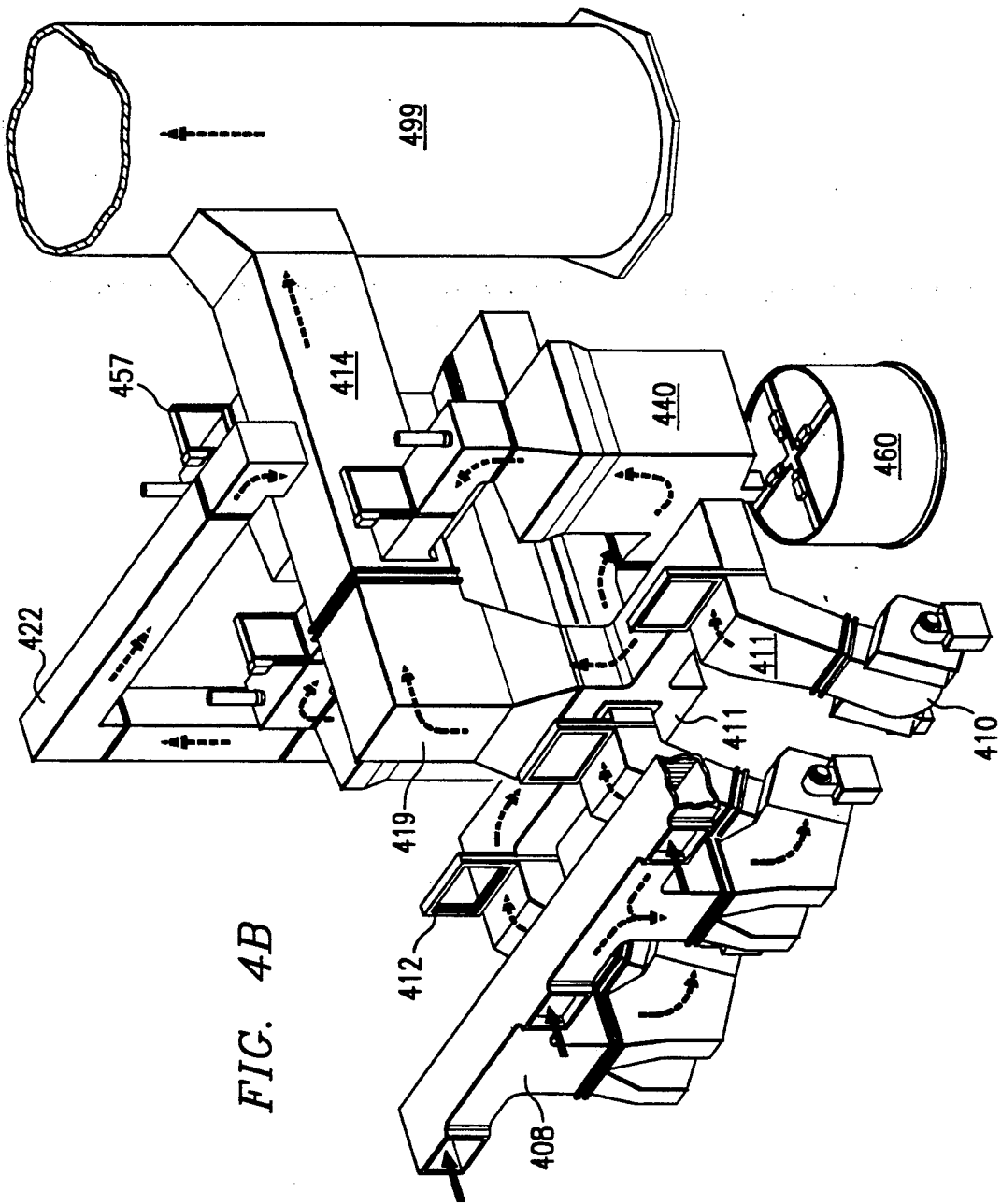

FIG. 4B shows additional detail of the flue gas routing. Three induced draft fans 410 are used to control the pressure in the combustion chamber of boiler 100, and these fans also ensure steady flow of the exhaust gasses. The fan inlet manifold 408 routes gasses from the precipitator 406 to the three fans 410, and the fans 410 drive the gasses into absorber inlet plenum 411. This plenum is connected (through respective dampers 415 seen in FIG. 4C and described below) to the inlet of each of the scrubber towers 440, and also through bypass plenum 419 to outlet plenum 414.

In many cases, the scrubber towers 440 are able to reduce the sulfur content in the exhaust gas stream to well below that required. Thus, part of the exhaust gas stream is normally routed around the scrubber towers 440, and is combined with the output of the scrubber towers 440 in outlet plenum 414 (which feeds smokestack 499). Depending on the sulfur content of the fuel, the amount of bypass may be adjusted to achieve the desired emission target.

In the presently preferred embodiment, the scrubber towers 440 are so efficient that a significant amount of exhaust gasses can be bypassed around the scrubber towers 440, and this keeps the stack gas temperature adequately high (in the range of 165 through 180 degrees Fahrenheit). If the scrubbed exhaust gases were ever cooled too much by their passage through the scrubber towers 440, some additional heating can be added by the reheat air duct 422. In the presently preferred embodiment, the efficiency of the scrubber towers is high enough that bypass air can keep up the stack temperature, and the reheat path 422 is never needed. However, some systems routinely use such a reheating input.

In the towers 440, the gas flow in contacted with a liquid flow. Each scrubber tower 440 has a closed-loop fluid flow cycle with its own tank 460.

Figure 4C:
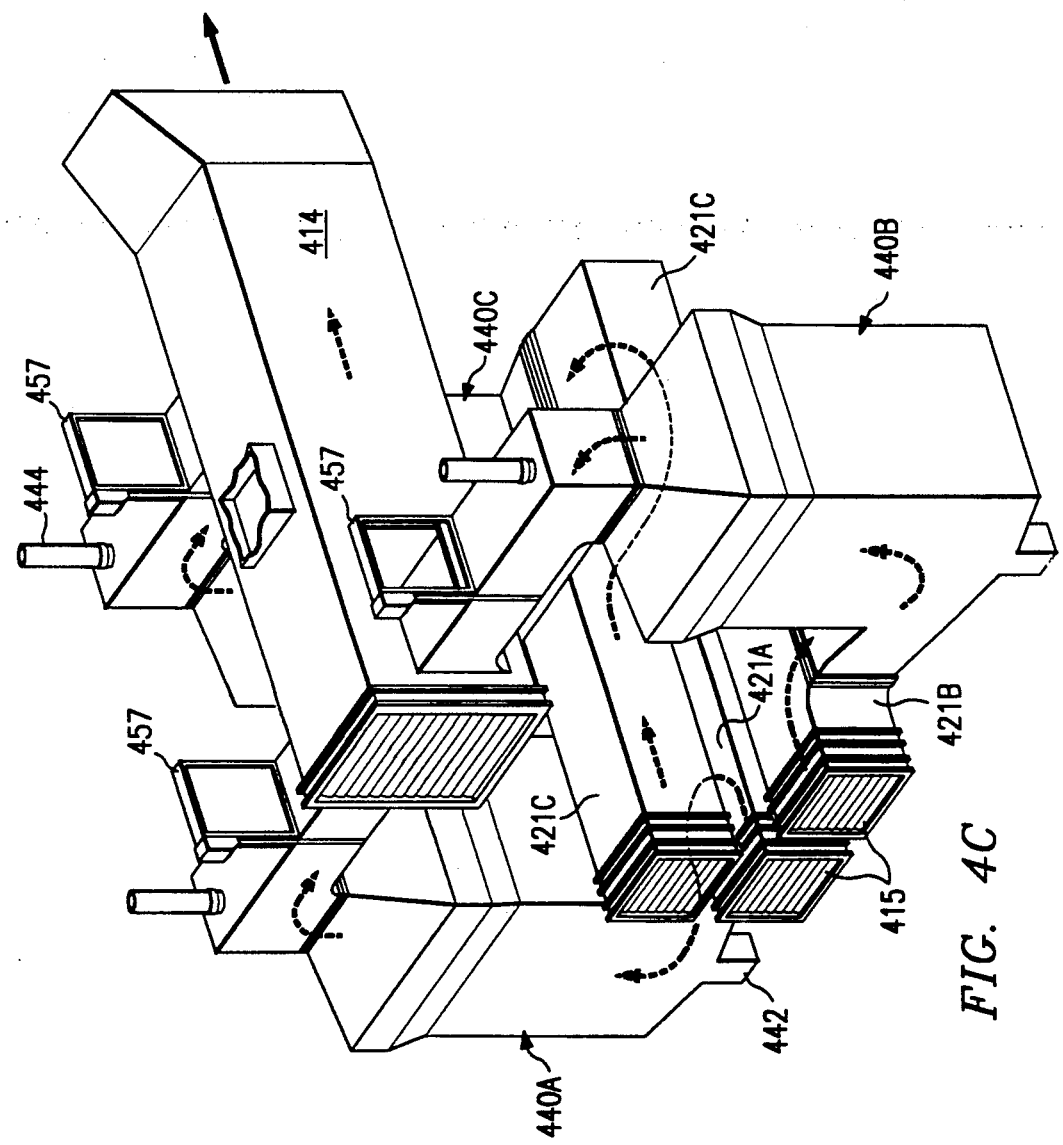

FIG. 4C shows additional detail of the gas flow from the absorber inlet dampers 415 through to the absorber outlet dampers 457.

Three double dampers 415 are each connected to the absorber inlet plenum 411 (not shown in this Figure). Each damper 415 includes a control damper coupled with an isolating damper. The control damper is variable, over a certain range, to modulate the gas flow rate. The isolating damper is used to completely shut off the flow to a particular tower, when it is necessary to take one of the towers out of service. As is conventional, an enclosed ring of positive pressure is provided around the dampers to avoid escape of combustion exhaust gasses.

Each of the dampers 415 feeds a duct 421. Duct 421A feeds flue gasses to tower 440A, duct 421B feeds flue gasses to tower 440B, and duct 421C feeds flue gasses to tower 440C.

A vent 444 is provided at the top of every tower 440. (This vent can be used for an air purge when a tower is shut down.) A guillotine outlet damper 457 can disconnect any of the towers 440 from the outlet plenum 414.

Figure 4D:
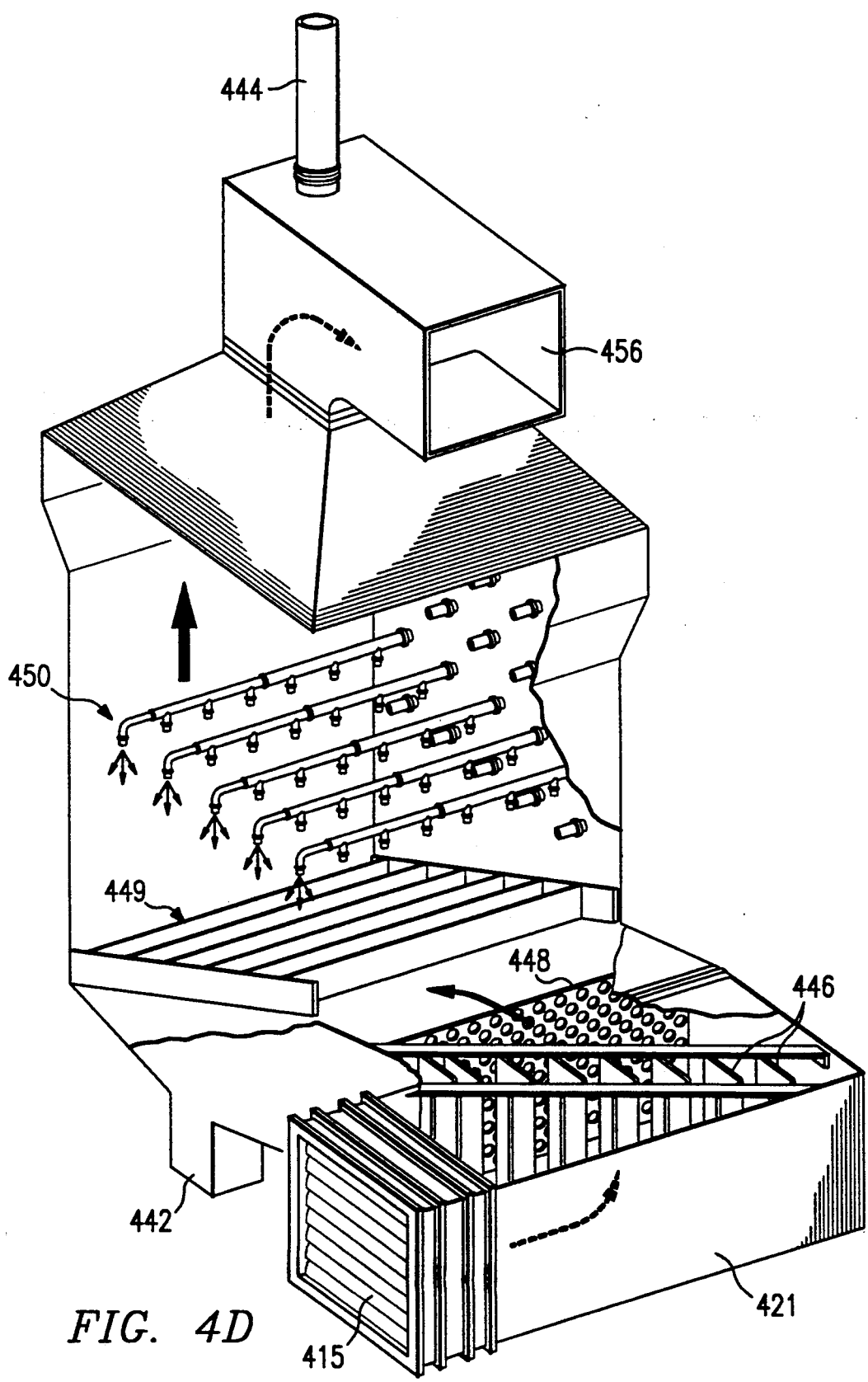

FIG. 4D shows additional detail of the interior of one scrubber tower 440. Duct 421 leads the flue gasses into the lower part of tower 440, where they flow upwards while a slurry is sprayed downward. In the scrubber tower, the large surface area of contact between the falling droplets and the rising gases will tend to equalize the temperatures of the scrubber solution and of the scrubbed exhaust gas. In the presently preferred embodiment, the temperature of the solution in the scrubber reaction tank is about 141 degrees Fahrenheit, and this is also approximately equal to the temperature of the exhaust gases exiting the scrubber tower.

Turning vanes 446, perforated plate 448, and ladder vanes 449 equalize the volumetric flow of gas over the cross-sectional area of the large duct 421, and over the width of tower 440. In the presently preferred embodiment, the ladder vanes 449 range from 5'6" to 19'3" above the top of the tank 460.

As the flue gasses flow upwards, a liquid slurry is continually sprayed downwards from spray headers 450. There are four levels of headers 450, although only one is shown in FIG. 4D for clarity. Each level includes 5 headers 450, and each header 450 includes 7 spray nozzles.

Figure 4E:
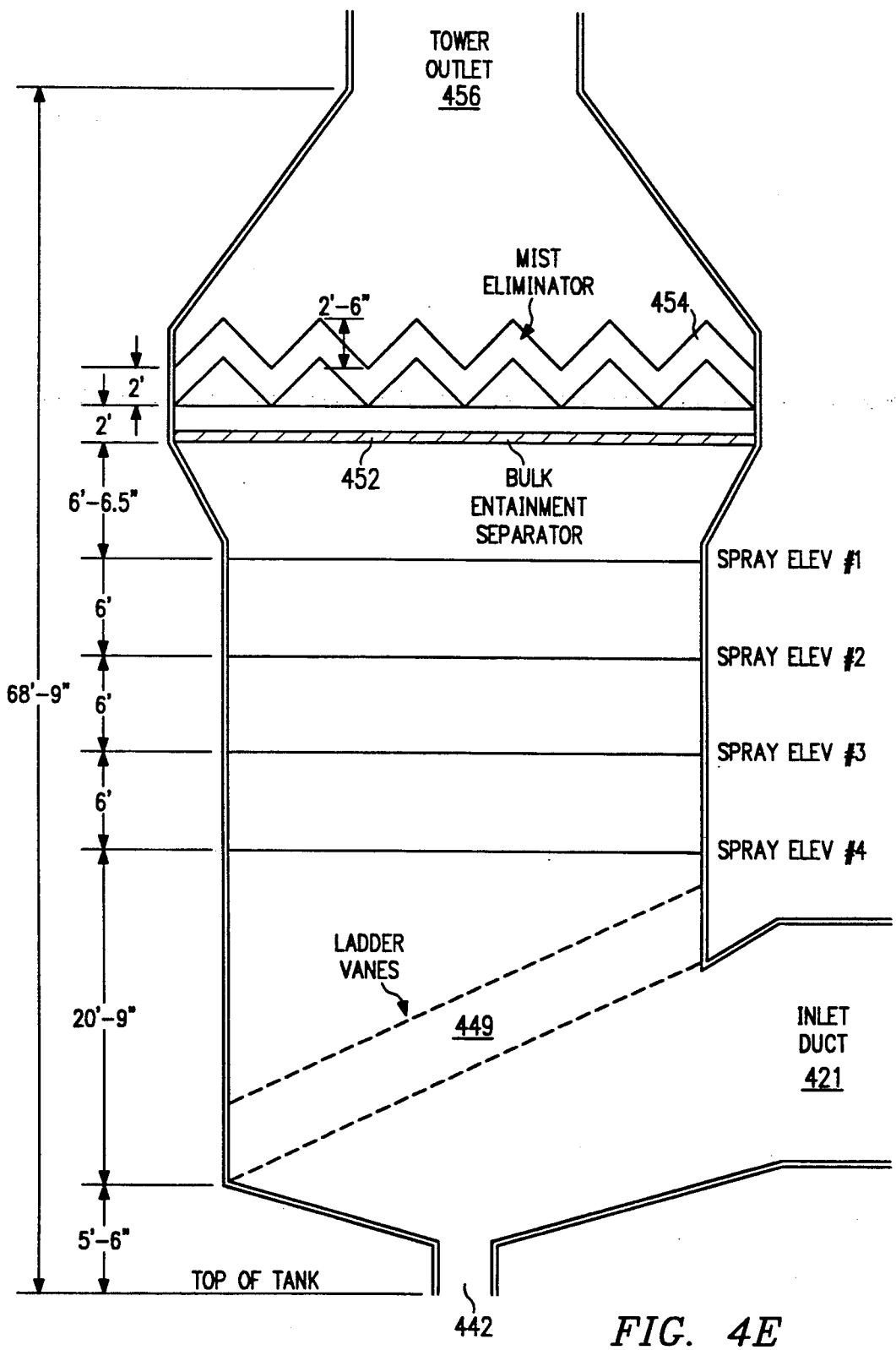
FIG. 4E is a schematic cross-section of a counterflow scrubber tower and reaction tank, like that used in the presently preferred embodiment.

FIG. 4E is a schematic cross-section of a counterflow scrubber tower, like that used in the presently preferred embodiment. The elevations of the headers 450 are shown for reference, although the headers themselves are not shown in this Figure.

The nozzles of the first level of spray headers 450, in the presently preferred embodiment, are 25'6" above the top of the tank 460. The second, third, and fourth levels are each spaced 6 feet above the next-lower levels.

Above the highest level of spray nozzles 450 are bulk entrainment separators 452, to catch any large particulates, and above those are mist eliminators 454, to catch any smaller droplets. The bulk entrainment eliminators 452, in the presently preferred embodiment, are about 50'9" above the top of the tank. The bottom of the mist eliminators 454, in the presently preferred embodiment, is located about 52'9" above the top of the tank. The mist eliminators 454, in the presently preferred embodiment, are about 30" high, and are spaced about two feet apart.

The liquid spray falls down through the interior of the scrubber tower 440, passes the ladder vanes 449, and is channeled into a chute 442, which returns the liquid to the tank 460. The flue gasses proceed upward to tower outlet 456 (which is connected to outlet plenum 414, not shown in this Figure).

SCRUBBER FLUID CYCLE

Figure 5A:
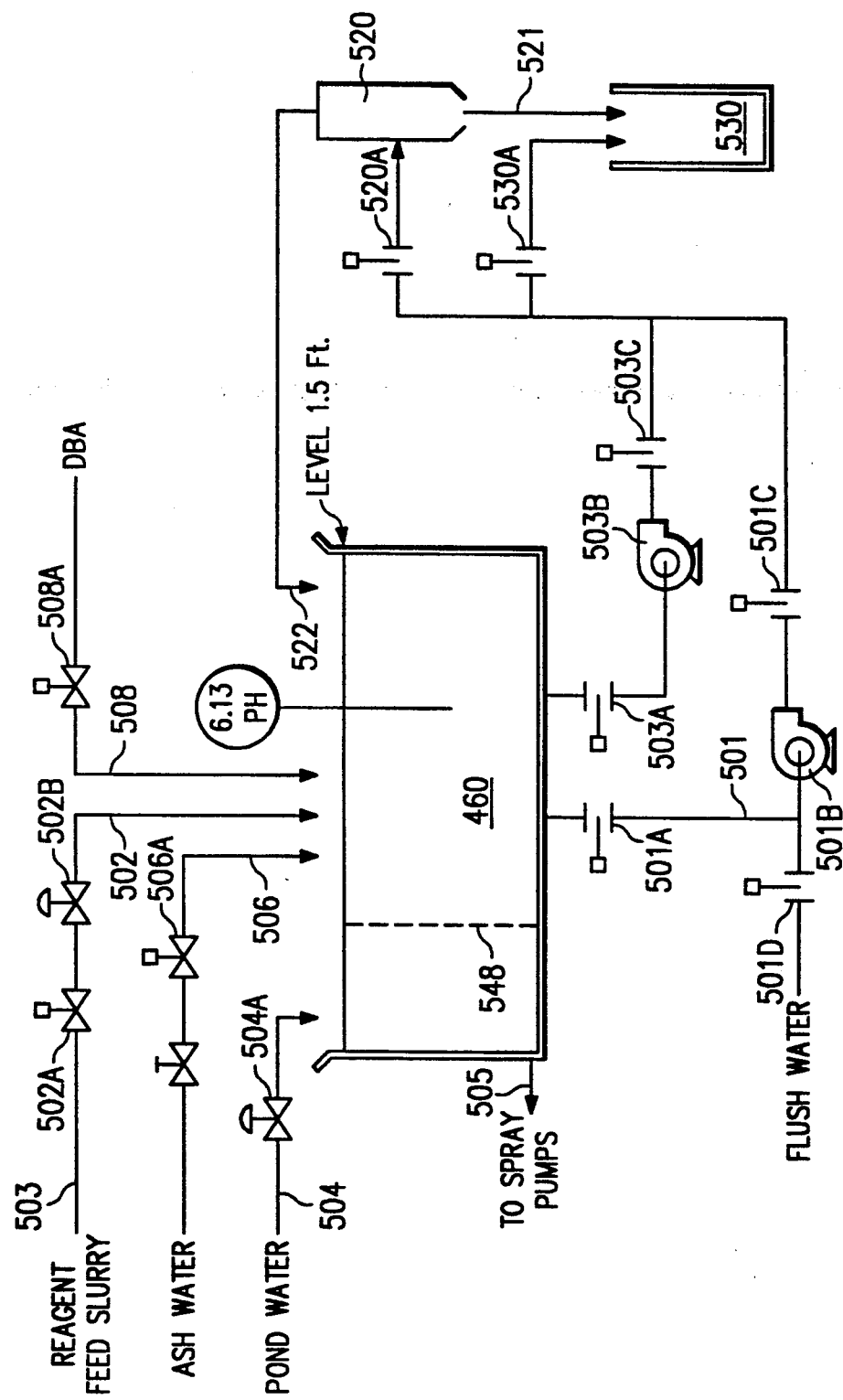
FIG. 5A schematically shows the fluid flow relations in the scrubber reaction tank.

FIG. 5A schematically shows the fluid flow relations in the scrubber reaction tank 460. This diagram schematically shows flow and control relationships.

Feed 502, regulated by an isolation valve 502A and a control valve 502B, provides limestone slurry as needed to maintain the pH of tank 460 at the target value. Under operator control, the tank is fed with a makeup solution which is a limestone slurry, and this slurry is about 35% solids by weight. The limestone, in the presently preferred embodiment, is specified to be at least 95% $CaCO_3$, and no more than 1.2% $MgCO_3$. The flow of the makeup solution is controlled to maintain the pH of the solution in the tank within predetermined limits.

Flow 504 is the return of supernate from the sulfate settling pond. This flow, controlled by valve 504A, helps to maintain the level of tank 460.

Note that two bottom withdrawal flows 501 and 503 are provided. Flow 501 is gated by section valve 501A, and pumped by pump 501B, and gated again by discharge valve 501C. Similarly, the other bottom withdrawal 503 is gated by a suction valve 503A, pumped by a pump 503B, and gated again by discharge valve 503C. These two parallel bottom withdrawal paths are provided merely for redundancy.

Under operator control, one of the bottom extractor pumps 501B or 503B occasionally removes a small flow of sulfate-rich slurry from the bottom of the tank 460. (This flow, in the presently preferred embodiment, is typically about 16.1% wt total solids, and about 2.57% wt of this flow is 325 mesh or finer.) The output of these two bottom withdrawal paths is connected, through a gate valve 520A, to a Hydroclone ™ separator 520. This separator 520 provides a top supernate return 522 (about 76% v/v of flow 501/503, in the presently preferred embodiment) back into the reaction tank 460 for further oxidation. Separator 520 also provides a bottom output 521, which is almost entirely a calcium sulfate slurry, and which is pumped into a holding tank 530, diluted (for better fluid flow), and thence pumped to a drying pond. (The bottom withdrawal 521 from separator 520, in the presently preferred embodiment, is typically about 51.1% wt solids, and 22.68% wt of the flow 521 is 325 mesh or finer.) The net rate of calcium sulfate product in this system is in the neighborhood of 45,000 pounds per hour, and all of this appears in flow 521.

A bypass valve 530A is provided so that sludge can be pumped directly into holding tank 530 if desired. Sludge from holding tank 530 is periodically pumped to a large open air pond (not shown), from which supernate can be returned to provide water feed 504.

An additional flow 506, gated by valve 506A, provides emergency makeup water. In the presently preferred embodiment, this emergency makeup source is the supernate water recovered from the holding pond for bottom ash.

In addition, a feed 508 is provided for dibasic acid (DBA), gated by a valve 508A. As noted above, DBA is a buffer.

In addition, an important withdrawal from tank 460 is draw 505. This draw is taken from behind the isolation screen 548 and is connected to feed the spray pumps which provide solution to spray headers 450.

SPRAY PUMPS AND SPRAY HEADERS

Solution is continually withdrawn from the tank, through inlet filter 548 (a slotted plate, which excludes large solids), and pumped up to the spray headers 450.

In the presently preferred embodiment, each of the four levels of spray headers 450 has its own pump. Under operator control, the bottom one or two of the four spray pumps may be switched off, depending on the fuel sulfur level. (Normally pumps will be switched off from the bottom up, since the droplets from the top header have the longest distance to fall, and therefore are the most efficiently utilized.) Each of these spray pumps, in the presently preferred embodiment, has an output of 19,000 gpm.

In the presently preferred embodiment, the scrubber reaction tank has a diameter of 53 feet, and holds fluid to a depth of about 26 feet. Thus, this tank has a capacity of about 437,000 gallons. If all four pumps are running, the tank's fluid volume turns over in just under 6 minutes. This is an aggressively designed system with a highly loaded tank; turnover times under 8 minutes are unusual, and 11 minutes or longer would be a conservative design figure.

The pH of the returned solution in the chute 442 is believed to be in the approximate range of 3.5 to 4.5 (although this is not known with certainty). The temperature at this point is about 138°–140° F.

SAMPLE PREVIOUS REACTION TANK CONFIGURATION

Figure 5B:
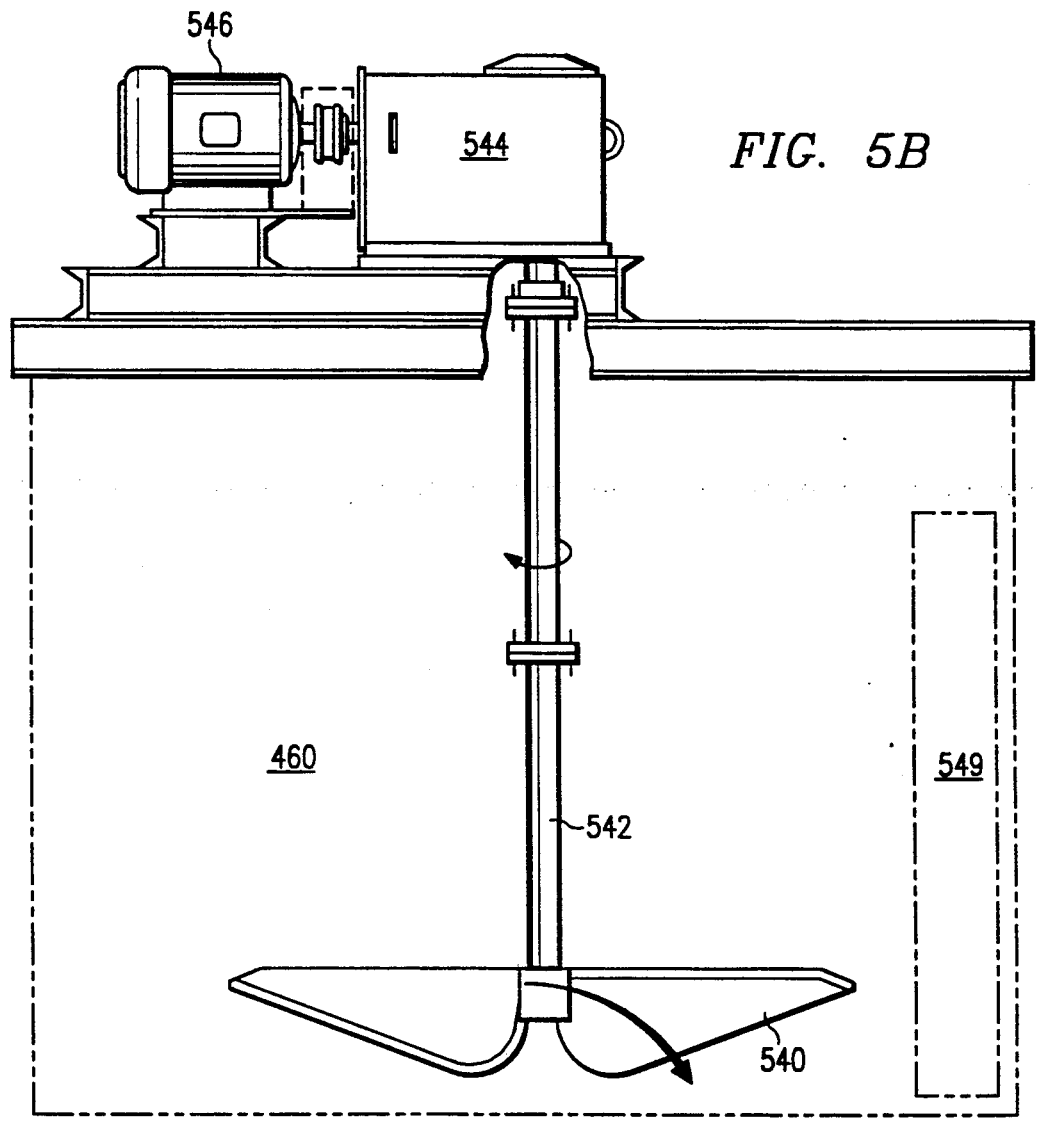
FIGS. 5B and 5C are plan and sectional views of the scrubber reaction tank of the presently preferred embodiment.
Figure 5C:
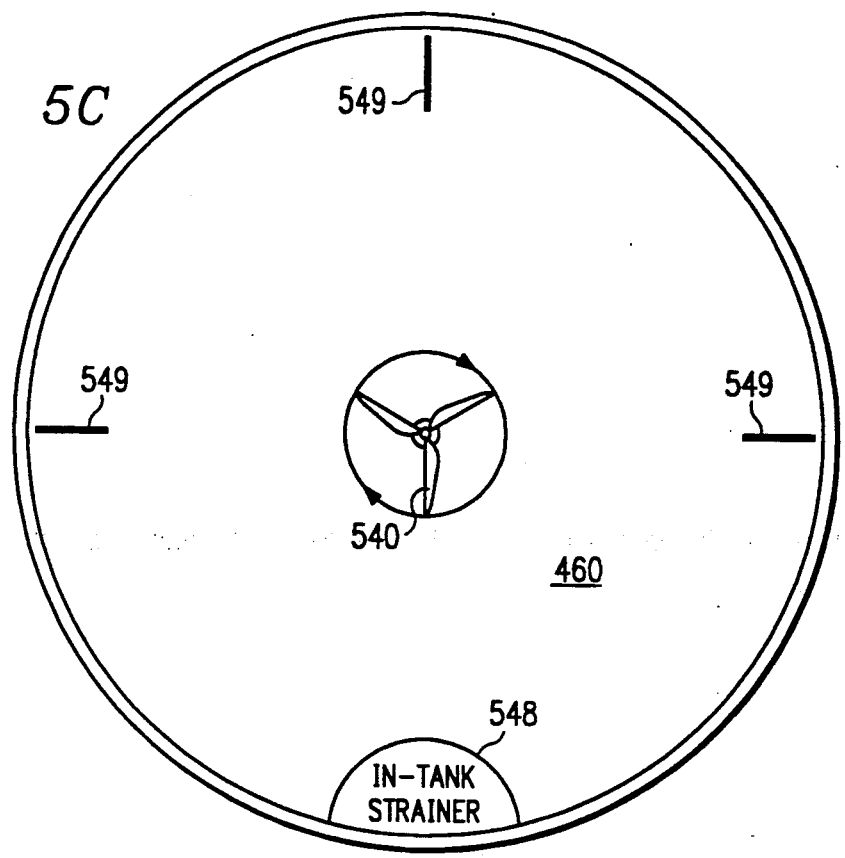
Figure 5D:
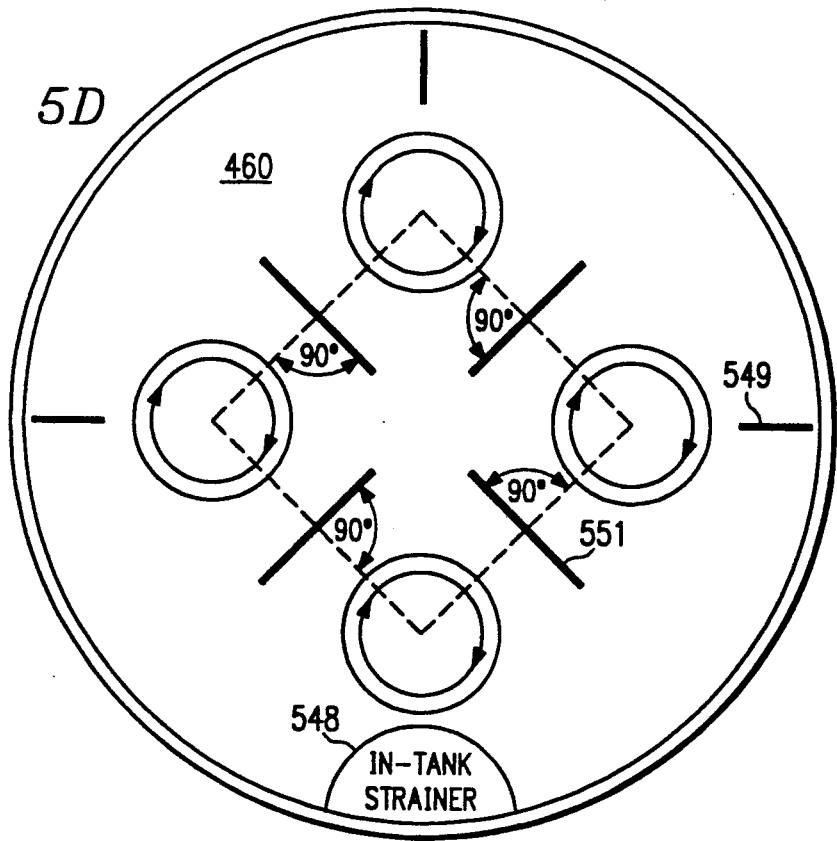
FIG. 5D is a plan view of a prior art scrubber reaction tank configuration.

The presently preferred embodiment was realized by modification of the scrubber reaction tanks 460 in a system like that of FIG. 5D. To help describe the advantages of the disclosed innovations, the prior structure will first be described in detail.

As shown in FIGS. 5D, the previously used scrubber reaction tank included four impellers, and four sparge rings, each supported about six to seven feet off the floor of the tank 460. Each of these sparge rings was a circular manifold, about 9 feet in diameter, with 45 circular[19] holes, each 11/16-inch in diameter, in its underside.

[19]The convention wisdom has been that circular air holes were needed, to inject air into the reaction tank fluid. Presumably this was motivated by a desire to maximize the bubble surface area and residence time for a given volume of air.

The sparge rings 553 were fed with low-pressure air, at about 20 psi. (This air was piped in through the side of the tank 460.) This would produce a stream of bubbles from each of the orifices in the sparge rings. Concentric with each sparge ring was a radial flow impeller. Each of these impellers was about 102" in diameter, and was driven by a 150-horsepower motor. (In service, at least two of these impeller motors would be operated at all times, but, depending on the fuel sulfur content, not necessarily all four of them.) Thus, the flow caused by this impeller would suck material off the bottom of the tank, and blow it out over the sparge ring. Thus, fine particulates would be sucked up and blown through the most oxygenated part of the solution.

Baffles 551 were included in the tank, to separate the flow zones at the four impellers. In addition, sidewall edge baffles 549 were provided around the circumference of the tank.

This arrangement had the problems noted above, particularly including scaling around the sparge rings and tank bottom. In this embodiment, the net flow rate of air to the sparge rings was initially about 2700 scfm per sparge ring. (This is about three times as much as would be needed if all oxygen were consumed in oxidation of sulfites.)

The former, unmodified system had four 102-inch centrifugal (i.e., radial flow) impellers. The modified system has one 144-inch impeller. The old system had four 150-horsepower motors (although normally only two of these would need to be operated at any one time). The modified system has only one 20-horsepower motor.

In the unmodified system, it was normal to find two to ten feet of solids crusted on the bottom of the tank whenever the tank was taken out of service.

FORCED-AIR LIQUID-PHASE OXIDATION

FIGS. 5B and 5C show the innovative structure which was used to replace the structure of FIGS. 5D.

FIG. 5B is a section view of the tank and impeller arrangement of the presently preferred embodiment. A large impeller 540, which, in the presently preferred embodiment, is 12 feet in diameter, is supported and driven by shaft 542, which is driven at 21 rpm by gear box 544, which is driven by motor 546 (which is only a 20 hp motor, in the presently preferred embodiment). The direction of flow across the impeller blades of the presently preferred embodiment is also schematically indicated by a curved arrow.

In this structure, the baffles 551 were removed, but the sidewall edge baffles 549 are retained. The use of single impeller 540, and the removal of baffles 551, provides a significantly different flow design: In the presently preferred embodiment, this impeller 540 provides a strong component of axial flow. That is, the flow pattern of this impeller directs a stream downwards towards the center of the bottom of the tank. This will therefore naturally produce outward flow around the bottom of the tank, and upward flow around the circumference of the tank.

Air is introduced through three lances 590, each of which is located fairly close to the bottom of the tank 460. (The bottom of each lance 590 is about two feet from the bottom of the tank 460 in the presently preferred embodiment, but of course this dimension can be varied.)[20] In the presently preferred embodiment, two of the lances 590 are located nine feet from the sidewall of the tank 460, and the third lance is located approximately 2'8" from the sidewall. (These dimensions can be varied.)

[20]Thus, the lance system can be used to inject air into the 1 foot to 5 foot zone not used by prior oxidation devices. Alternatively, if desired, the lances can be let down right to the bottom of the tank.

The top end of each lance 590 is connected to a low-pressure air supply, and air is flowed through the three lances at an adjustable flow rate in the neighborhood of 5000 scfm. (A pressure of about 20 psi is normally sufficient to achieve this.) With this arrangement, it has been found that approximately no scale deposition or sludge settling occurs on the bottom of the tank 460.

In addition, an alternative embodiment has also been tested, where the sparge rings are removed and replaced with lances 590, without changing out the impeller structure. This has also been found to give significantly improved oxidation efficiency. However, in these tanks, some deposition of solids occurs in the tank and also in the tower. Thus, this embodiment is not as successful as the most preferred embodiment, but does give a significant improvement over the prior art sparge ring methods. In particular, this embodiment gives significantly improved oxidation performance over the prior art sparge ring methods.

LANCE DESIGN

Figure 6C:
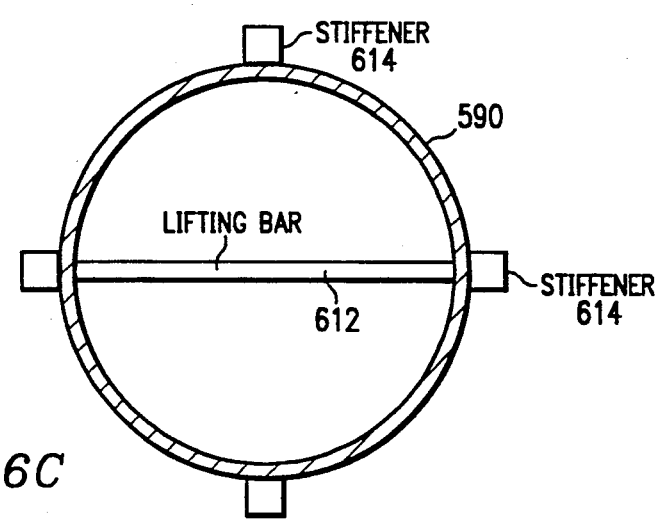
FIG. 6C is a partial plan view of the lance, showing reinforcements used in the top portion of the lance, in the presently preferred embodiment.
Figure 6A:
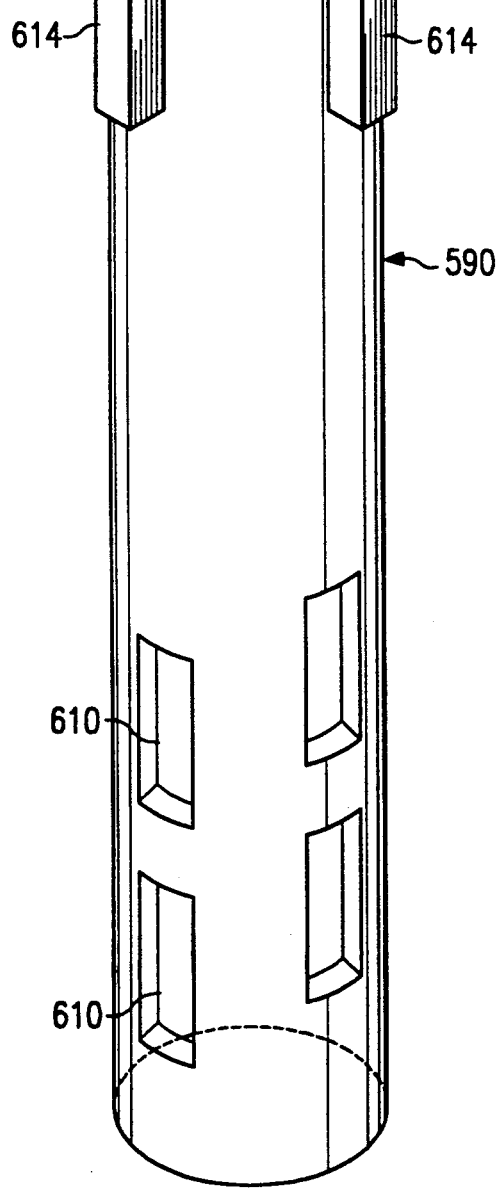
FIG. 6A shows the lance of the presently preferred embodiment.

FIG. 6A shows the lance 590 of the presently preferred embodiment. In the presently preferred embodiment, the lance 590 is 25'9¾" long overall, and is made of type 316L stainless steel pipe, four inches in diameter, of schedule 40 thickness. A carbon-steel pipe was tested, but was found to be insufficiently corrosion-resistant.

A flange 616 (11" in diameter, in the presently preferred embodiment) at the top of lance 590 permits the lance to mounted to the top of the tank. A lifting bar 612 (¼"×2" section, in the presently preferred embodiment) bridges the mouth of the lance as shown. Stiffener ribs 614 (⅜" square, in the presently preferred embodiment) extend downward from flange 616 for three feet, in the presently preferred embodiment, to help resist the sideways forces which will be seen by the lance in service.

Figure 6B:
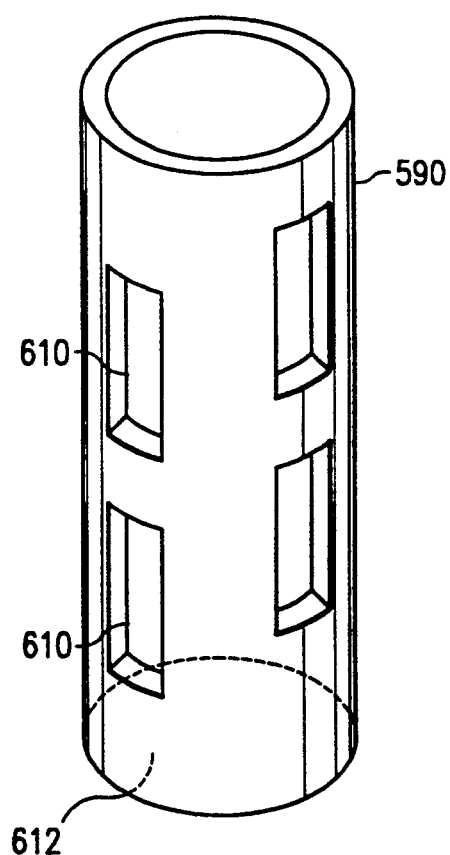
FIG. 6B is a detail view of the lower end of the lance of the presently preferred embodiment, showing the staggered pattern of rectangular holes.

The slots 610 in the side of the lance will now be described in greater detail. In the presently preferred embodiment, each lance 590 has 28 rectangular slots 610, of about 1-by-4-inch size, in the lowest part of its length. These holes 610 are arranged as shown in FIG. 6B. Four columns of seven holes each, in the presently preferred embodiment, are spaced at 90° separations around the lance. Adjacent columns are staggered, in the presently preferred embodiment, as shown in FIG. 6B, with a 2" vertical offset. Vertically adjacent holes within a columns are separated by 2", in the presently preferred embodiment. The lance's lower end 612 is closed, in the presently preferred embodiment.

FIG. 6C is a partial plan view of the lance 590 of the presently preferred embodiment, showing the relative locations of stiffeners 614 and lifting bar 612. In this Figure, flange 616 is omitted for clarity.

LANCE POSITIONS

Figure 7A:
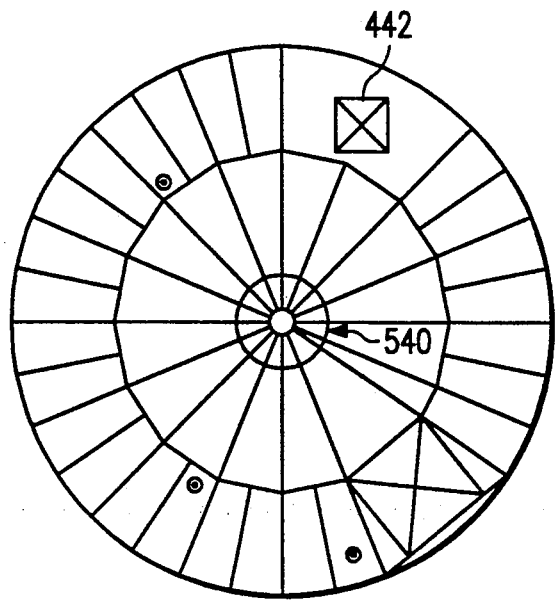
FIG. 7A shows the positioning of the three lance mounts in the top cover of the scrubber tank, in the presently preferred embodiment.

FIG. 7A shows the positioning of the three lance mounts in the top cover of the scrubber tank, in the presently preferred embodiment, in relation to the impeller 540 and chute 442.

SUPPORT FOR LANCE

Figure 7B:
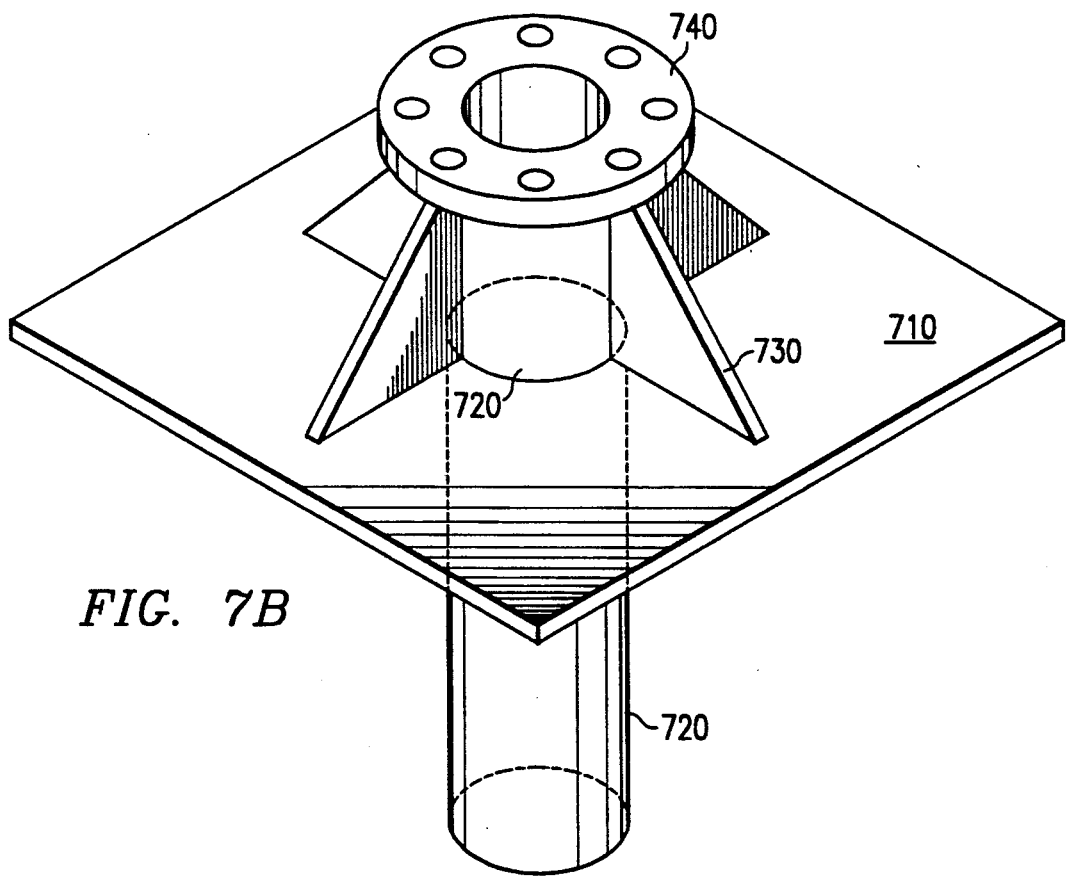
FIG. 7B shows details of the support sleeve used in the cover of the reaction tank, in the presently preferred embodiment, to support the lance against bending forces.

FIG. 7B shows details of the support sleeve used in the cover of the reaction tank, in the presently preferred embodiment, to support the lance against bending forces.

Support plate 710, which is welded to the cover of the tank 460, supports a sleeve 720 which extends about four feet downward into the tank, and also less than a foot upward. The fluid flow in the reaction tank may exert substantial force on the lance 590. Therefore, in the presently preferred embodiment, as shown in this Figure, webs 730 provide support for the lance 590 against the strong mechanical bending forces which fluid flow will exert on it. The flange 616 of each lance 590 can be attached to flange 740.

IMPELLERS IN REACTION TANK

The pumping capacity of the new impeller/motor combination is about 224,000 gallons per minute. With the old system, the pumping capacity of each of the four motor/impeller combinations was about 134,000 gallons per minute.

Heuristically, one way of thinking of the difference in impeller function between the modified design and the unmodified design is that the old design attempted to pull solids up from the bottom of the tank and push them through the aerated liquid. By contrast, the modified system pushes the aerated liquid through the solids-rich portion on the bottom of the tank.

RESULTING CHEMICAL ANALYSIS

It should be noted that, in use, the characteristics of the scrubber solution will change somewhat, unpredictably, from day to day. This may be affected by variation in the sulfur concentration of the fuel being burned, by changes in ambient temperature, or by other factors.

The pH in the scrubber reaction tank is monitored, and is controlled, in the presently preferred embodiment, to stay in the range of 5.85 to 6.0.

The magnesium concentration $[Mg^{++}]$ is about 2122 ppm, and the chloride concentration $[Cl^-]$ is about 7100 ppm, in the presently preferred embodiment. These values are not at all critical, and are provided merely for fuller description of this specific embodiment.

RESULTING LACK OF SCALING AND SLUDGE

In the presently preferred embodiment, scrubbing is achieved at an operating cost (excluding labor and maintenance) of $39.00 per ton of $SO_2$ removed.[21]

[21] This has been achieved with a limestone cost of $9.33 per ton for crushed limestone delivered at the scrubber. (In the presently preferred embodiment, the limestone source is by-product fines from stone-crushing operations.) Of course, in some locations, the cost of limestone may be lower or higher, or other carbonate sources, such as dolomite or chalk, may be cheaper to use. However, this cost figure can readily be adjusted accordingly.

This compares with much higher costs (in the range of $52-62 per ton of $SO_2$ removed) which were measured using the prior art Combustion Engineering process described above. The largest part of the cost savings is savings in auxiliary power.[22] In the presently preferred embodiment, this has resulted in a 93% reduction in mixer power consumption. In addition, it is believed that further cost savings can be achieved by reducing limestone consumption, since the present invention provides more efficient use of the limestone. Of course, since the most preferred embodiment provides greatly reduced scaling, additional cost savings will appear as reduced maintenance and labor costs associated with tower cleanouts due to scaling.

[22] In the presently preferred embodiment, the mixer power consumption was actually reduced by 93%.

FURTHER MODIFICATIONS AND VARIATIONS

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

It should be noted that the carbonate/sulfite/sulfate cycle described is not the only one. A variety of chemical cycles have been used or proposed for scrubbing of flue gas. Other agents for SO₂ capture which have been used include other carbonates and bicarbonates, particularly sodium and magnesium compounds. Various of the chemical cycles which have been proposed have used other basic additives, such as lime, sodium hydroxide, etc. The present invention is most particularly applicable to scrubbers using the carbonate/sulfite/sulfate cycle, as described; but the innovative teachings can also be applied to scrubbers which use other basic additives in addition to, or even instead of, calcium carbonate.

Note that other shapes can alternatively be used for the air emission holes in the lance, while retaining at least some advantages of the rectangular holes of the presently preferred embodiment. For example, hexagonal holes, or large oval holes, can be used instead, advantageously but less preferably.

Alternatively, the disclosed lance system can be used along with side-mounted agitators or even in no-agitator tank designs.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A coal-fired steam-electric power generating station, comprising:
   (a) a burner;
   (b) a boiler which converts feed water into steam by using heat generated by said burner;
   (c) a steam turbine connected to receive steam from said boiler and to generate electricity accordingly;
   (d) a smokestack connected to discharge exhaust gases from said burner into the atmosphere; and
   (e) a scrubber interposed to receive at least part of the flow of exhaust gases from said burner to said smokestack, said scrubber including:
      (i) a scrubber tower connected to an exhaust of said burner so that exhaust gases flow through the interior of said scrubber tower;
      (ii) spray nozzles positioned and connected so that droplets of liquid emitter by said spray nozzles travel through the interior of said scrubber tower;
      (iii) a reaction tank connected to receive the liquid flow from said scrubber tower;
      (iv) a reaction solution makeup source connected to supply a slurry containing carbonates to said reaction tank wherever the pH in said reaction tank falls below a predetermined level;
      (v) a product removal pump connected to remove dense particulates from the bottom of said reaction tank;
      (v) a main spray pump connected to pump solution from said reaction tank to supply said nozzles;
      (vi) at least one motor-driven impeller in the interior of said reaction tank, said impeller producing a flow pattern which sweeps fine particulates off the bottom of said reaction tank; and
      (vii) one or more lances which are connected to a low-pressure air supply and are positioned to introduce air bubbles into said reaction tank near the bottom thereof.

2. The system of claim 1, wherein said makeup solution is a slurry predominantly comprising calcium carbonate.

3. The system of claim 1, wherein said carbonate makeup solution comprises a slurry of crushed limestone.

4. The system of claim 1, wherein said burner is connected to burn pulverized coal.

5. The system of claim 1, wherein said burner is connected to burn lignite.

6. The system of claim 1, further comprising a centrifugal separator, connected to receive the slurry output from said oxidizing tank, and connected to return the less dense portions of said output back to said oxidizing tank.

7. The system of claim 1, wherein each said reaction tank includes no more than one of said impellers therein.

8. The system of claim 1, wherein said lances each extend vertically down into said reaction tank, and are perforated to discharge air horizontally.

9. The system of claim 1, wherein ones of said lances are respectively positioned to introduce air near the sidewall of said reaction tank.

10. The system of claim 1, wherein ones of said lances are respectively positioned to introduce air within one foot of the sidewall of said reaction tank, and within three feet of the bottom of said reaction tank.

11. The system of claim 1, wherein said reaction tank has substantially vertical sidewalls, and said lances each extend substantially vertically down into said reaction tank and are each respectively positioned to introduce air within two feet of the sidewall of said reaction tank, and within three feet of the bottom of said reaction tank.

12. The system of claim 1, wherein said reaction tank has substantially vertical sidewalls, and said lances each extend substantially vertically down into said reaction tank and are each respectively positioned to introduce air within two feet of the sidewall of said reaction tank, and within three feet of the bottom of said reaction tank, and wherein said impeller is positioned to force a vertical downflow along the approximate center axis of said tank.

13. The system of claim 1, wherein said reaction tank has a substantially cylindrical shape with vertical sidewalls, and said lances each extend substantially vertically down into said reaction tank, said impeller has a diameter which is greater than 20% of the diameter of said tank, and said impeller is an axial-flow impeller.

14. The system of claim 1, wherein said product removal pump is activated periodically, under operator control.

15. The system of claim 1, wherein said spray nozzles are positioned and connected so that droplets of liquid emitted by said spray nozzles fall downward through the interior of said scrubber tower.

16. The system of claim 1, further comprising a chute, positioned to collect droplets which have fallen downward through the interior of the scrubber tower; and wherein said reaction tank is connected to receive said fluid flow through said chute.

17. A flue gas desulfurization system, connectable to receive a flow of exhaust gases and to discharge scrubbed gases to a smokestack, comprising:
   a scrubber tower, connected so that exhaust gases flow through the interior of said scrubber tower;
   spray nozzles, positioned and connected so that droplets of liquid emitted by said spray nozzles fall through the interior of said scrubber tower;
   a chute, positioned to collect droplets which have fallen downward through the interior of the scrubber tower;

a reaction tank, connected to receive the fluid flow from said chute;

a reaction solution makeup source, connected to supply a basic slurry to said reaction tank whenever the pH in said reaction tank falls below a predetermined level;

a product removal pump, connected to remove dense particulates from the bottom of said reaction tank;

a main spray pump, connected to pump solution from said reaction tank to supply said nozzles;

and further comprising at least one motor-driven impeller in the interior of said reaction tank, said impeller producing a downward flow pattern along the approximate center of said tank which sweeps fine particulates off the bottom of said tank;

and further comprising one or more lances, which are connected to a low-pressure air supply and are positioned to introduce air bubbles into said tank near the bottom thereof.

18. A flue gas desulfurization system, connectable to receive a flow of exhaust gases and to discharge scrubbed gases to a smokestack, comprising:

a scrubber tower, connected so that exhaust gases flow through the interior of said scrubber tower;

spray nozzles, positioned and connected so that droplets of liquid emitted by said spray nozzles fall through the interior of said scrubber tower;

a chute, positioned to collect droplets which have fallen downward through the interior of the scrubber tower;

a reaction tank having substantially vertical sidewalls, connected to receive the fluid flow from said chute;

a reaction solution makeup source, connected to supply a basic slurry to said reaction tank whenever the pH in said reaction tank falls below a predetermined level;

a product removal pump, connected to remove dense particulates from the bottom of said reaction tank;

a main spray pump, connected to pump solution from said reaction tank to supply said nozzles;

and further comprising at least one motor-driven impeller in the interior of said reaction tank, said impeller producing a flow pattern which sweeps fine particulates off the bottom of said reaction tank;

and further comprising at least three lances, which are connected to a low-pressure air supply, and which each extend substantially vertically down into said reaction tank, and which are each respectively positioned to introduce air near the bottom of said reaction tank.

* * * * *